US010371134B2

(12) United States Patent
Tsuboi et al.

(10) Patent No.: US 10,371,134 B2
(45) Date of Patent: Aug. 6, 2019

(54) SEALED COMPRESSOR AND REFRIGERATION UNIT COMPRISING SEALED COMPRESSOR

(71) Applicant: PANASONIC APPLIANCES REFRIGERATION DEVICES SINGAPORE, Singapore (SG)

(72) Inventors: Kousuke Tsuboi, Shiga (JP); Kiwamu Watanabe, Shiga (JP); Akihiko Kubota, Kyoto (JP); Hironari Akashi, Shiga (JP); Terumasa Ide, Kyoto (JP)

(73) Assignee: PANASONIC APPLIANCES REFRIGERATION DEVICES SINGAPORE, Singapore (SG)

( * ) Notice: Subject to any disclaimer, the term of this patent is extended or adjusted under 35 U.S.C. 154(b) by 670 days.

(21) Appl. No.: 14/383,447

(22) PCT Filed: Apr. 12, 2013

(86) PCT No.: PCT/JP2013/002523
§ 371 (c)(1),
(2) Date: Sep. 5, 2014

(87) PCT Pub. No.: WO2013/153825
PCT Pub. Date: Oct. 17, 2013

(65) Prior Publication Data
US 2015/0030478 A1    Jan. 29, 2015

(30) Foreign Application Priority Data

Apr. 12, 2012 (JP) .................................. 2012-090756
Apr. 12, 2012 (JP) .................................. 2012-090757
(Continued)

(51) Int. Cl.
*F16C 19/10*     (2006.01)
*F04B 39/00*     (2006.01)
(Continued)

(52) U.S. Cl.
CPC .......... *F04B 39/0094* (2013.01); *F04B 27/04* (2013.01); *F04B 35/04* (2013.01);
(Continued)

(58) Field of Classification Search
CPC ...... F04B 35/04; F04B 39/0094; F04B 39/12; F04B 39/121; F04B 39/122; F04B 39/02;
(Continued)

(56) References Cited

U.S. PATENT DOCUMENTS 7,137,791 B2 * 11/2006 Manke ................ F04B 39/0094
                                                         417/372
2005/0008502 A1    1/2005 Manke et al.
(Continued)

FOREIGN PATENT DOCUMENTS

| CN | 101191475 | 6/2008 |
|---|---|---|
| CN | 101589232 | 11/2009 |

(Continued)

OTHER PUBLICATIONS

Extended European Search Report issued in corresponding European Application No. 13775001.4, dated Oct. 29, 2015, 11 pages.
(Continued)

*Primary Examiner* — Kenneth J Hansen
*Assistant Examiner* — Chirag Jariwala
(74) *Attorney, Agent, or Firm* — Hamre, Schumann, Mueller & Larson, P.C.

(57) ABSTRACT

A sealed compressor comprises a sealed container (101) which accommodates an electric component (105) and a compression component (106); wherein the compression component (106) includes a shaft (110) including a main shaft section (111) and an eccentric shaft section (112), a cylinder block (114), a piston (126), and a main bearing unit (120) mounted to the cylinder block (114) and supporting the main shaft section (112) such that the main shaft section
(Continued)

(112) is rotatable, a thrust ball bearing (132) mounted to a thrust surface (130) of the main bearing unit (120); and the thrust ball bearing (132) includes a plurality of balls (134) held in a cage (133), an upper race (135) having main surfaces one of which is in contact with upper portions of the balls (134); and a lower race (136) having main surfaces one of which is in contact with lower portions of the balls (134) and; a restricting means for restricting a displacement of the upper race (135) with respect to the shaft (110).

24 Claims, 27 Drawing Sheets

(30) Foreign Application Priority Data

Dec. 4, 2012 (JP) ................................. 2012-264880
Dec. 4, 2012 (JP) ................................. 2012-264881

(51) Int. Cl.
| | |
|---|---|
| F25B 1/00 | (2006.01) |
| F04B 35/04 | (2006.01) |
| F04B 39/02 | (2006.01) |
| F16C 35/06 | (2006.01) |
| F16C 35/07 | (2006.01) |
| F16C 23/08 | (2006.01) |
| F16C 27/06 | (2006.01) |
| F16C 33/58 | (2006.01) |
| F04B 27/04 | (2006.01) |
| F25B 31/00 | (2006.01) |

(52) U.S. Cl.
CPC ............ *F04B 39/02* (2013.01); *F04B 39/023* (2013.01); *F16C 19/10* (2013.01); *F16C 23/08* (2013.01); *F16C 27/066* (2013.01); *F16C 33/58* (2013.01); *F16C 35/06* (2013.01); *F16C 35/07* (2013.01); *F25B 1/005* (2013.01); *F25B 1/00* (2013.01); *F25B 31/002* (2013.01); *F25B 2400/07* (2013.01)

(58) Field of Classification Search
CPC .. F04B 39/0238; F04B 39/0246; F04B 49/20; F04B 53/14; F04B 39/127; F04B 39/14; F04B 53/006; F04B 27/04; F04B 39/023; F16C 19/10; F16C 23/06; F16C 23/08; F16C 33/30; F16C 33/38; F16C 33/3806; F16C 33/58; F16C 35/04; F16C 35/06; F16C 35/07; F16C 27/066; F25B 1/00; F25B 1/02; F25B 31/002; F25B 31/02; F25B 31/023; F25B 2400/07; F25B 1/005
USPC ...................................... 417/410.1, 415, 902
See application file for complete search history.

(56) References Cited

U.S. PATENT DOCUMENTS

| | | | |
|---|---|---|---|
| 2007/0025864 A1* | 2/2007 | Cho ..................... | F04B 39/0253 417/415 |
| 2007/0058895 A1 | 3/2007 | Paschoalino | |
| 2010/0047093 A1 | 2/2010 | Watanabe | |
| 2010/0158721 A1 | 6/2010 | Yanase et al. | |
| 2011/0200462 A1* | 8/2011 | Inagaki ............... | F04B 39/0027 417/321 |
| 2011/0265510 A1* | 11/2011 | Kim ..................... | F04B 27/0404 62/498 |

FOREIGN PATENT DOCUMENTS

| | | | |
|---|---|---|---|
| CN | 102011724 | | 12/2011 |
| EP | 1 705 374 | | 9/2006 |
| EP | 2 325 489 | | 5/2011 |
| JP | 2005-500476 | | 1/2005 |
| JP | 2006-161705 | | 6/2006 |
| JP | 2006161705 A | * | 6/2006 |
| JP | 2007-032562 | | 2/2007 |
| JP | 2008-002371 | | 1/2008 |
| JP | 2009-019543 | | 1/2009 |
| JP | 2009019543 A | * | 1/2009 |
| JP | 2010-112249 | | 5/2010 |
| JP | 2010-255556 | | 11/2010 |
| WO | 20071061103 | | 5/2007 |
| WO | 20101079894 | | 7/2010 |

OTHER PUBLICATIONS

Office Action issued in corresponding Chinese Application No. 201380013500.2, dated Nov. 3, 2015, 20 pages with an English translation.

* cited by examiner

SEALED COMPRESSOR AND REFRIGERATION UNIT COMPRISING SEALED COMPRESSOR

TECHNICAL FIELD

The present invention relates to a sealed compressor, and a refrigeration unit comprising the sealed compressor.

BACKGROUND ART

In recent years, it is desired that a sealed compressor for use with a refrigeration unit such as a refrigerator-freezer achieve a higher efficiency for reducing electric power consumption and reduction of a noise. There is known a bearing device incorporated into the sealed compressor which is intended for the higher efficiency of the sealed compressor (see, for example, Patent Literature 1). Hereinafter, the bearing device disclosed in Patent Literature 1 will be described with reference to FIG. 30.

FIG. 30 is an enlarged view of a portion of the bearing device disclosed in Patent Literature 1.

As shown in FIG. 30, in the bearing device disclosed in Patent Literature 1, a radial bearing hub 26 has an upper annular extending section 62 supporting an extending portion of a crankshaft 20. An axial roller bearing (axial ball bearing) 76 is mounted to outside of the upper annular extending section 62.

The axial roller bearing 76 includes a circular cage 68 including a plurality of balls 66. The plurality of balls 66 are supported by an upper annular race 64 and a lower annular race 70. The upper annular race 64 and the lower annular race 70 are seated on a surface of a flange 74 around the crankshaft 20 and an upper annular surface 60 of the radial bearing hub 26, respectively.

CITATION LIST

Patent Literature

Patent Literature 1: Translation of PCT Application Publication No. 2005-500476

SUMMARY OF THE INVENTION

Technical Problem

However, in the bearing device disclosed in Patent Literature 1, each of the upper annular race 64 and the lower annular race 70 has a flat plate shape. For this reason, when lubricating oil is fed to the axial roller bearing 76, the fed lubricating oil tends to flow to an outer peripheral side of the upper annular race 64 or the lower annular race 70. There is a possibility that an amount of the lubricating oil directly fed to the surfaces of the balls 66 becomes insufficient depending on operating conditions of the sealed compressor, which may result in a situation in which a noise increases or an efficiency of the sealed compressor decreases.

To solve the above mentioned problem, a raceway groove formed by an annular groove may possibly be provided on the upper annular race 64 or the lower annular race 70. In this case, the lubricating oil stays in the raceway groove of the lower annular race 70, which enables the lubricating oil to be fed stably to the surfaces of the balls 66.

However, depending on constituents accuracy of the upper annular race 64 or the lower annular race 70, or operating conditions of the sealed compressor, the center axis of the raceway groove of the upper annular race 64 and the center axis of the raceway groove of the lower annular race 70 may be deviated from each other. In that case, a contact state between the raceway groove of the upper annular race 64 and the raceway groove of the lower annular race 70, and the balls 66 becomes unstable, which may impede smooth rolling of the balls 66.

The present invention is directed to solving the above described problem associated with the prior art, and an object of the present invention is to provide a sealed compressor which generates a less noise and has a higher efficiency, while achieving stably supply of the lubricating oil to the balls and to the upper and lower races, and smooth rolling of the balls, and a refrigeration unit comprising the sealed compressor.

The above stated problems do not arise in a case where the upper annular race 64 and the lower annular race 70 are flat plates which are annular and are made of metal, because the balls, and the upper and lower annular race and are able to be displaced independently of each other.

Solution to Problem

To achieve the above described object, a sealed compressor of the present invention comprises an electric component including a stator and a rotor; a compression component actuated by the electric component; a sealed container which accommodates the electric component and the compression component and stores lubricating oil therein; wherein the compression component includes a shaft including a main shaft section to which the rotor is fastened and an eccentric shaft section, a cylinder block having a compression chamber, a piston reciprocatable inside the compression chamber, a connecting member for coupling the piston to the eccentric shaft section, and a main bearing unit mounted to the cylinder block and supporting the main shaft section such that the main shaft section is rotatable, a thrust ball bearing mounted to a thrust surface of the main bearing unit; and the thrust ball bearing includes a plurality of balls held in a cage, an upper race having main surfaces one of which is in contact with upper portions of the balls; and a lower race having main surfaces one of which is in contact with lower portions of the balls and; at least one limiting means for limiting a displacement of the upper race with respect to the shaft; wherein raceway grooves formed by annular grooves are provided on the main surface of the upper race and the main surface of the lower race, respectively, the main surfaces facing each other; and wherein the balls are placed on the raceway groove of the upper race and the raceway groove of the lower race.

In this configuration, since the balls are placed in the raceway grooves formed by the annular grooves, lubricating oil fed to a region near the thrust ball bearing stays in the raceway grooves, and is fed stably to the surfaces of the balls. Thus, the lubricating oil can be fed stably to a portion of the balls and a portion of the upper race and a portion of the lower race which portions are in contact with each other. In addition, the limiting means is able to suppress a deviation between the raceway groove of the upper race and the raceway groove of the lower race, which otherwise would impede smooth rolling of the balls. Thus, the balls can roll stably.

Therefore, in the sealed compressor, a noise can be mitigated and a higher efficiency can be achieved, while achieving stably supply of the lubricating oil to the balls and to the upper and lower races, and smooth rolling of the balls.

In the present invention, the at least one limiting means may include a vertical limiting means capable of suppressing the upper race from being displaced with respect to the shaft in a gravitational force direction, i.e., in a vertical direction, and/or a radial limiting means capable of suppressing the upper race from being displaced with respect to the shaft in a radial direction, i.e., in a horizontal direction.

For example, as will be described later, in embodiments, the vertical limiting means (first limiting means) comprises a pressing section and a washer as a pressing member, while the radial limiting means (second limiting means) may comprise clearances, fitting by a fastening means, and a washer such as an adjustment member.

Advantageous Effects of Invention

In accordance with the sealed compressor and a refrigeration unit comprising the sealed compressor, the smooth rotation of the balls can be maintained, and therefore, a higher efficiency of the sealed compressor can be achieved.

In accordance with the sealed compressor and the refrigeration unit comprising the sealed compressor, the upper race and the shaft are able to rotate together. Therefore, a sliding loss of the thrust ball bearing can be suppressed, and hence a higher efficiency of the sealed compressor can be achieved.

DESCRIPTION OF EMBODIMENTS

Hereinafter, preferred embodiments of the present invention will be described with reference to the drawings. Throughout the drawings, the same or corresponding constituents and members are identified by the same reference symbols and will not be described repetitively. Also, throughout the drawings, the constituents requited to describe the present invention are selected and depicted, and another constituents are not depicted, in some cases. Moreover, the present invention is in no way limited to the embodiments and modified examples described below.

Embodiment 1

According to Embodiment 1 of the present invention, a sealed compressor comprises an electric component including a stator and a rotor; a compression component actuated by the electric component; a sealed container which accommodates the electric component and the compression component and stores lubricating oil therein; wherein the compression component includes a shaft including a main shaft section to which the rotor is fastened and an eccentric shaft section, a cylinder block having a compression chamber, a piston reciprocatable inside the compression chamber, a connecting member for coupling the piston to the eccentric shaft section, and a main bearing unit mounted to the cylinder block and supporting the main shaft section such that the main shaft section is rotatable, a thrust ball bearing mounted to a thrust surface of the main bearing unit; and the thrust ball bearing includes a plurality of balls held in a cage, an upper race having main surfaces one of which is in contact with upper portions of the balls; and a lower race having main surfaces one of which is in contact with lower portions of the balls and; at least one limiting means for limiting a displacement of the upper race with respect to the shaft; wherein raceway grooves formed by annular grooves are provided on the main surface of the upper race and the main surface of the lower race, respectively, the main surfaces facing each other; and wherein the balls are placed on the raceway groove of the upper race and the raceway groove of the lower race.

In the sealed compressor according to Embodiment 1, the at least one limiting means is constituted by a first limiting means configured to limit a radial displacement of the upper race with respect to the shaft.

Figure 2:
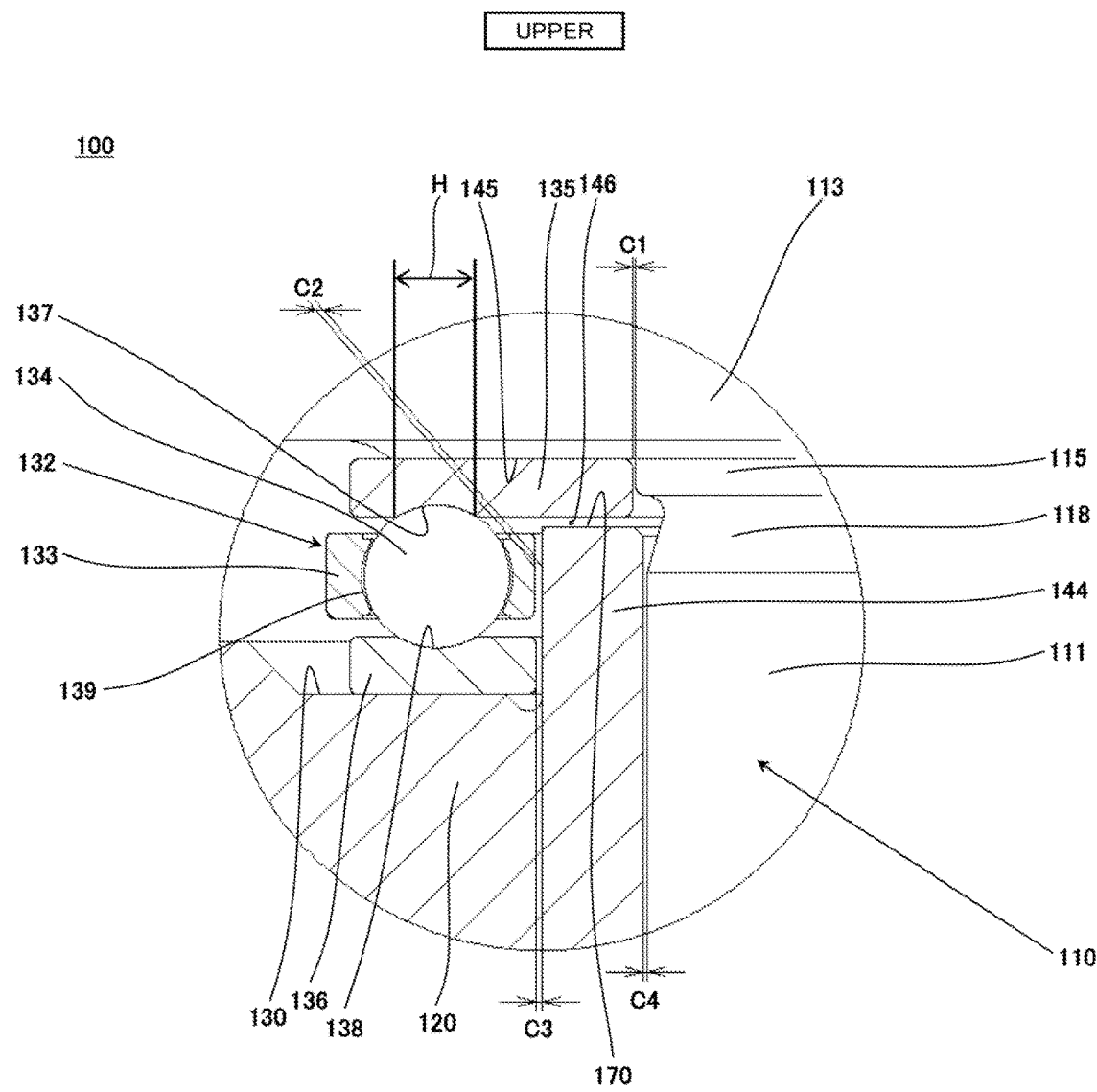
FIG. 2 is a view schematically showing a region D of FIG. 1, in an enlarged manner.
Figure 3:
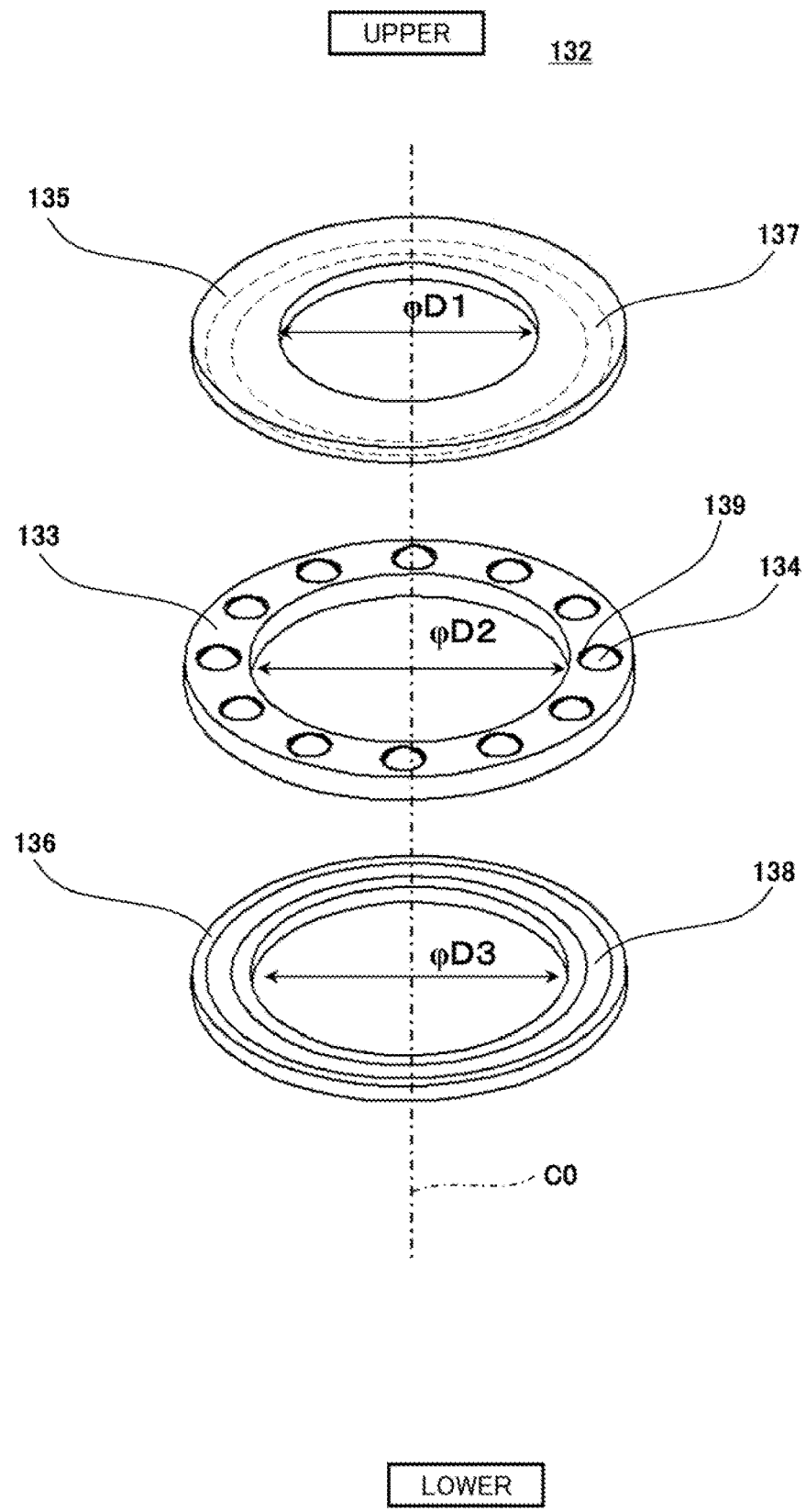
FIG. 3 is an exploded perspective view of a thrust ball bearing in the sealed compressor of FIG. 1.

Hereinafter, an exemplary sealed compressor according to Embodiment 1 will be described with reference to FIGS. 1 to 3.

[Configuration of Sealed Compressor]

Figure 1:
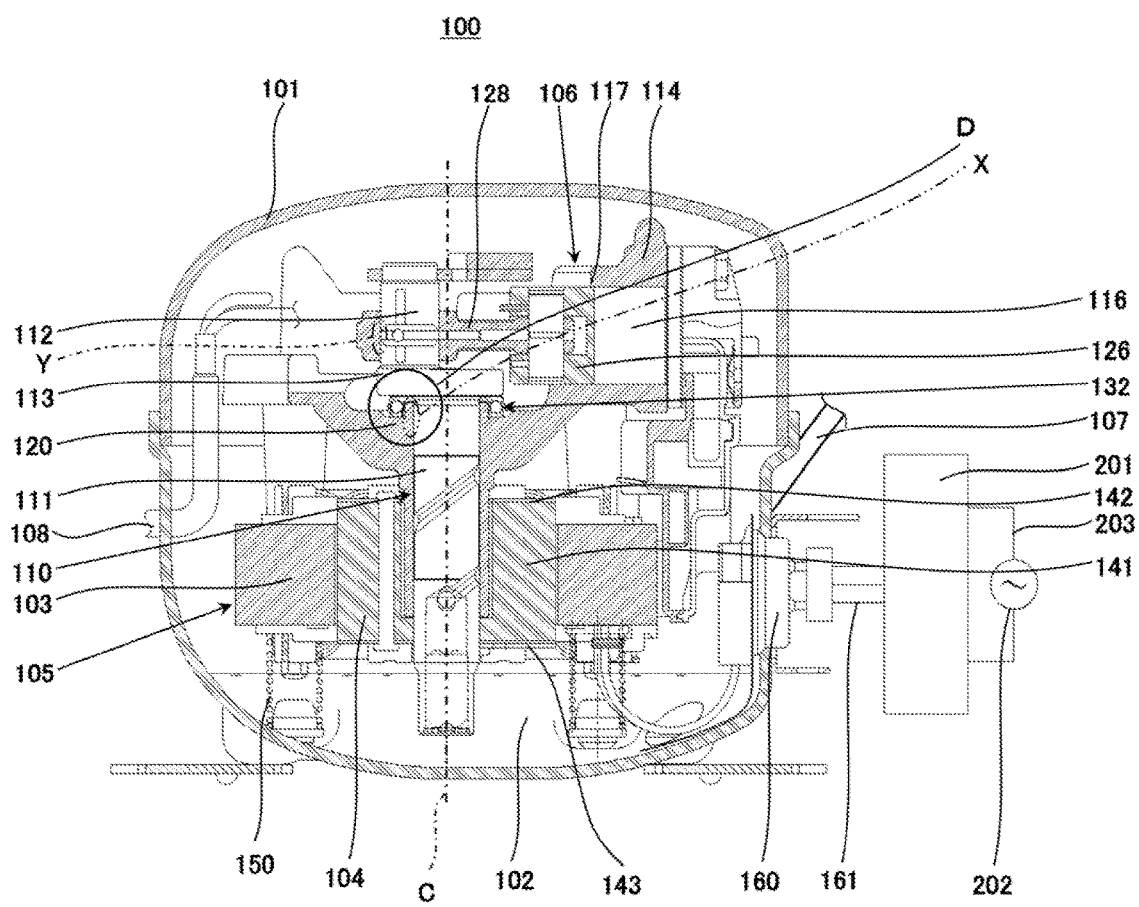
FIG. 1 is a longitudinal sectional view of a sealed compressor according to Embodiment 1.

FIG. 1 is a longitudinal sectional view of a sealed compressor according to Embodiment 1. FIG. 2 is a view schematically showing a region D of FIG. 1, in an enlarged manner. FIG. 3 is an exploded perspective view of a thrust ball bearing in the sealed compressor of FIG. 1. In FIGS. 1 and 2, upper and lower sides of the sealed compressor are depicted as upper and lower sides in these Figures.

As shown in FIG. 1, a sealed compressor 100 according to Embodiment 1 includes a sealed container 101. The seal container 101 is provided with a suction pipe 107 and a discharge pipe 108 such that the suction pipe 107 and the discharge pipe 108 penetrate a wall portion of the sealed container 101. An upstream end of the suction pipe 107 is connected to a cooler (evaporator) 228 (see FIG. 28), while a downstream end thereof communicates with an interior of the sealed container 101. An upstream end of the discharge pipe 108 communicates with a discharge muffler (not shown), while a downstream end thereof is connected to a condenser 231 (see FIG. 28).

A terminal 160 is fastened to the sealed container 101. The terminal 160 is electrically connected to an electric component 105 as will be described later via an electric wire which is not shown. The terminal 160 is electrically connected to an inverter unit 201 via a lead wire 161.

A utility power supply 202 is electrically connected to the inverter unit 201 via an electric wire 203. The inverter unit 201 is configured to invert electric power supplied to the electric component 105 via the terminal 160. Thereby, the electric component 105 is actuated at any one of plural operating frequencies.

Lubricating oil 102 is stored in a bottom portion of the sealed container 101. Refrigerant (not shown) is filled inside of the sealed container 101. A compression component 106 which suctions and compresses the refrigerant and the electric component 105 which actuates the compression component 106 are supported inside of the sealed container 101 by means of springs 150. In Embodiment 1, the compression component 106 is positioned above the electric component 105.

As the refrigerant, for example, HFC refrigerant or the like which has a low global warming potential (GWP), which is represented by R134a whose ozone depletion potential is zero, may be used. As the lubricating oil 102, lubricating oil which has a high compatibility with the refrigerant may be used. Lubricating oil having a viscosity of VG3 to VG8 may be used.

The electric component 105 includes a stator 103 and a rotor 104. The rotor 104 includes a stack 141 in which a plurality of electromagnetic steel plates 140 (see FIG. 12) are stacked together, and a first member 142 and a second member 143 which sandwich the stack 141. The rotor 104 is fastened to a main shaft section 111 of a shaft 110 constituting the compression component 106 by shrink fit, etc.

The compression component 106 includes the shaft 110, a cylinder block 114, a piston 126, a connecting member 128 and a thrust ball bearing 132. The cylinder block 114 includes a cylinder 117 defining a compression chamber 116 of a substantially cylindrical shape, having a center axis extending horizontally, and a main bearing unit 120. A piston 126 is inserted into the cylinder 117. The piston 126 is coupled to an eccentric shaft section 112 of the shaft 110 via the connecting member 128.

The shaft 110 includes the main shaft section 111 having a center axis C extending vertically, the eccentric shaft section 112 having a center axis which is eccentric with respect to the main shaft section 111, and a joint section 113 connecting the main shaft section 111 to the eccentric shaft section 112. The main shaft section 111 is rotatably supported on the main bearing unit 120 of the cylinder block 114. The thrust ball bearing 132 intervenes between the joint section 113 and the main bearing unit 120.

In the above described structure, a weight of the shaft 110 and a weight of the rotor 104 are supported by the main bearing unit 120 via the thrust ball bearing 132. The thrust ball bearing 132 enables the shaft 110 to rotate smoothly.

Next, a configuration of the shaft 110, the main bearing unit 120 of the cylinder block 114 and the thrust ball bearing 132 will be described in greater detail, with reference to FIGS. 1 to 3.

The joint section 113 of the shaft 110 has a substantially disc shape having a great wall thickness. The main shaft section 111 extends downward from a center portion of a lower main surface of the joint section 113. The eccentric shaft section 112 extends upward from a location in the vicinity of a peripheral portion of the upper main surface of the joint section 113. A flange surface 145 is formed on the lower main surface of the joint section 113 at a substantially right angle with respect to the center axis C of the main shaft section 111. The flange surface 145 has a substantially circular shape around the main shaft section 111 when viewed from below.

A substantially disc-shaped guide section 115 is formed on an upper portion (lower portion of the flange surface 145) of the main shaft section 111. The guide section 115 has a center axis conforming to the center axis C of the main shaft section 111, and is concentric with the main shaft section 111. An outer peripheral surface of the guide section 115 protrudes radially outward farther than an outer peripheral surface of a portion of the main shaft section 111 which is other than the guide section 115. Specifically, the guide section 115 has an outer diameter which is greater than an outer diameter of the main shaft section 111, and is equal to or less than 105% of the outer diameter of the main shaft section 111.

A recess 118 is formed between the main shaft section 111 and the guide section 115. The recess 118 has an outer peripheral surface located inward relative to an outer peripheral surface of the main shaft section 111. The recess 118 has a groove shape which is recessed inward. During an operation of the sealed compressor 100, even when the shaft 110 vibrates, it becomes possible to prevent a tip end portion of a bearing extending section 144 (described later) of the main bearing unit 120 and the main shaft section 111 of the shaft 110 from contacting each other, and thereby avoid damage to the main shaft section 111.

Although in Embodiment 1, the main shaft section 111, the guide section 115 and the recess 118 are distinguished from each other, to easily explain shape of the shaft 110, these sections are treated as the main shaft section 111.

The main bearing unit 120 of the cylinder block 114 has a thrust surface 130 such that the thrust surface 130 is substantially perpendicular to a center axis of the main bearing unit 120. The thrust surface 130 has a ring shape when viewed from a vertical direction. The bearing extending section 144 having a cylindrical shape protrudes upward from an inner peripheral portion of the thrust surface 130.

An upper end 170 of the bearing extending section 144 is located as high as the recess 118 of the shaft 110 (i.e., the upper end 170 is located between an upper end and a lower end of the recess 118). The upper end 170 of the bearing extending section 144 is located under a lower surface of an upper race 135 (described later) of the thrust ball bearing 132. An inner peripheral upper end portion of the bearing extending section 144 is chamfered. In this structure, even if the shaft 110 and the tip end portion of the bearing extending section 144 contact each other, it becomes possible to avoid damage to the shaft 110.

The thrust surface 130 is provided with the thrust ball bearing 132. The thrust ball bearing 132 includes the upper race 135, a plurality of (12 in the present embodiment) balls 134, a cage 133 for holding the balls 134, and a lower race 136. These members are arranged in the order of the lower race 136, the cage 133, and the upper race 135 in an upward direction from the thrust surface 130. More specifically, the bearing extending section 144 is inserted in an inner periphery of the lower race 136 and an inner periphery of the cage 133. The upper race 135 is disposed such that the main shaft section 111 (to be precise, guide section 115 and recess 118) is inserted in an inner periphery of the upper race 135.

The upper race 135 and the lower race 136 are made of, for example, thermally treated bearing steel so that their surface hardness falls within a range of HRC58~68, preferably HRC 58~62. The balls 134 are configured to have a surface hardness which is slightly higher than that of the upper race 135 and that of the lower race 136. Specifically, the balls 134 are made of, for example, case hardening bearing steel so that their surface hardness falls within a range of HRC60~70, preferably HRC62 to 67.

For this reason, it becomes possible to prevent the surfaces of the balls 134 from being abraded away soon. Therefore, it becomes possible to suppress a situation in which abrasions from the balls 134 contact the balls 134, the upper race 135 or the lower race 136, and thereby the balls 134, the upper race 135 or the lower race 136 is/are damaged. Thus, it becomes possible to avoid reduction of a life of the thrust ball bearing 132, and improve reliability of the thrust ball bearing 132.

The lower race 136 has a ring-shape (disc shape having an opening in a center portion thereof), and has a pair of upper and lower main surfaces. The lower race 136 is disposed such that its lower main surface is in contact with the thrust surface 130. The upper main surface (track surface) of the lower race 136 is provided with an annular groove, which forms a raceway groove 138. The raceway groove 138 has a cross-section of a circular-arc shape to be similar to a contour shape (contour shape of the cross-section which is taken along a center of the balls 134) of the balls 134. The balls 134 are placed in the raceway groove 138 of the lower race 136.

The cage 133 has a ring shape (disc shape having an opening in a center portion thereof), and has a pair of upper and lower main surfaces. The cage 133 is provided on the main surface with a plurality of (12, in the present embodiment) cage pockets 139. The cage pockets 139 are arranged to form a concentric circle with respect to the cage 133 when viewed from above. The cage pockets 139 have circular openings. Inner peripheral surfaces of the cage pockets 139 are formed as curved surfaces similar to the contour shapes of the balls 134, respectively. The balls 134 are held in the cage pockets 139, respectively.

The cage 133 has a thickness smaller than a diameter of the balls 134. Because of this structure, upper portions of the balls 134 protrude farther than the upper surface of the cage 133, while lower portions of the balls 134 protrude farther than the lower surface of the cage 133.

The upper race 135 has a ring shape (disc shape having an opening in a center portion thereof), and has a pair of upper and lower main surfaces. The upper race 135 has an outer diameter greater than an outer diameter of the flange surface 145 and has an inner diameter smaller than an outer diameter of the bearing extending section 144.

An annular groove is formed on the lower main surface (track surface) of the upper race 135, and forms a raceway groove 137. The raceway groove 137 has a cross-section of a circular-arc shape to be similar to the contour shape of the balls 134. The upper race 135 is configured such that the upper main surface is in contact with the flange surface 145, and the raceway groove 137 is in contact with the upper portions of the balls 134.

A height of the upper race 135, a height of the lower race 136, a diameter of the balls 134, a depth of the raceway groove 137 and a depth of the raceway groove 138 are suitably set so that the thrust ball bearing 132 contacts the flange surface 145 and the thrust surface 130.

In the present embodiment, the cage 133, the upper race 135 and the lower race 136 are disposed such that there are gaps between the cage 133 and the upper race 135, and between the cage 133 and the lower race 136.

The upper race 135 is disposed to have a gap 146 between its track surface and the upper end 170 of the bearing extending section 144. Thus, the upper race 135 and the upper end 170 of the bearing extending section 144 do not contact each other. This enables the balls 134 to roll smoothly between the upper race 135 and the lower race 136.

An inner diameter $\varphi D1$ of the upper race 135 is set smaller than an inner diameter $\varphi D2$ of the cage 133, and an inner diameter $\varphi D3$ of the lower race 136. The inner diameter $\varphi D2$ of the cage 133 is set greater than the inner diameter $\varphi D3$ of the lower race 136. In other words, the upper race 135, the cage 133 and the lower race 136 are configured such that the inner diameter $\varphi D1$ of the upper race 135 is smallest and the inner diameter $\varphi D2$ of the cage 133 is greatest.

The upper race 135, the guide section 115, the cage 133, and the bearing extending section 144 are configured such that a clearance C1 (first clearance) is smaller than a clearance C2 formed between the inner peripheral surface of the cage 133 and the outer peripheral surface of the bearing extending section 144. More specifically, the inner diameter $\varphi D1$ of the upper race 135, the outer diameter of the guide section 115, the inner diameter $\varphi D2$ of the cage 133, and the outer diameter of the bearing extending section 144 are suitably set so that the clearance C1 is smaller than the clearance C2.

Since the clearance C1 is set smaller than the clearance C2, it becomes possible to suppress the upper race 135 from being displaced (especially radially) with respect to the shaft 110. Therefore, a configuration in which the clearance C1 is smaller than the clearance C2 forms the limiting means (first limiting means) of Embodiment 1.

The upper race 135, the guide section 115, the lower race 136 and the bearing extending section 144 are configured such that the clearance C1 is smaller than a clearance C3 formed between the inner peripheral surface of the lower race 136 and the outer peripheral surface of the bearing extending section 144. More specifically, the inner diameter φD1 of the upper race 135, the outer diameter of the guide section 115, the inner diameter φD3 of the lower race 136, and the outer diameter of the bearing extending section 144 are suitably set so that the clearance C1 is smaller than the clearance C3.

Since the clearance C1 is set smaller than the clearance C3, it becomes possible to suppress the upper race 135 from being displaced (especially radially) with respect to the shaft 110. Therefore, a configuration in which the clearance C1 is smaller than the clearance C3 forms the limiting means (first limiting means) of Embodiment 1.

The clearance C2 is a clearance in a case where the cage 133 and the bearing extending section 144 are disposed so that the center of the inner diameter of the cage 133 and the center of the outer diameter of the bearing extending section 144 conform to each other. Likewise, the clearance C3 is a clearance in a case where the lower race 136 and the bearing extending section 144 are disposed so that the center of the inner diameter of the lower section 136 and the center of the outer diameter of the bearing extending section 144 conform to each other.

The cage 133, the lower race 136 and the bearing extending section 144 are configured such that the clearance C2 is greater than the clearance C3. This makes it possible to prevent the inner peripheral surface of the cage 133 and the outer peripheral surface of the bearing extending section 144 from contacting each other when the shaft 110 is rotating. Because of this, it becomes possible to prevent the inner peripheral surface of the cage 133 from abrading away.

Therefore, it becomes possible to suppress balls 134, the upper race 135 and the lower race 136, from being damaged, due to abrasion power generated by the abrasion of the inner peripheral surface of the cage 133, and hence avoid reduction of a life of the thrust ball bearing 132. As a result, reliability of the thrust ball bearing 132 can be improved.

In manufacturing process steps such as processing, if possible, the upper race 135, the main shaft section 111, and the bearing extending section 144 are preferably formed such that the clearance C1 formed between the inner peripheral surface of the upper race 135 and the outer peripheral surface (to be precise, outer peripheral surface of the guide section 115 of Embodiment 1) of the main shaft section 111 is smaller than a clearance C4 formed between the inner peripheral surface of the bearing extending section 144 and the outer peripheral surface of the main shaft section 111.

More specifically, the inner diameter φD1 of the upper race 135, the outer diameter of the guide section 115, the outer diameter of the main shaft section 111, and the inner diameter of the bearing extending section 144 are suitably set so that the clearance C1 is smaller than the clearance C4. For example, the clearance C1 may be equal to or less than ½ of a groove width H of the raceway groove 137 of the upper race 135, and may be equal to or greater than 1 μm and equal to or less than 500 μm.

The clearance C4 is a clearance in a case where the bearing extending section 144 and the main shaft section 111 are disposed such that the center of the inner diameter of the bearing extending section 144 and the center axis of the main shaft section 111 conform to each other.

During an operation of the sealed compressor 100, even when the shaft 110 vibrates, it becomes possible to suppress the upper race 135 from being displaced with respect to the shaft 110 (especially radially), because the clearance C1 is smaller than the clearance C4. That is, a configuration in which the clearance C1 is smaller than the clearance C4 forms the limiting means (first limiting means).

[Operation of Sealed Compressor]

Next, an operation of the sealed compressor 100 of Embodiment 1 will be described with reference to FIGS. 1 to 3.

Initially, the inverter unit 201 supplies the electric power supplied from the utility power supply 202 to the stator 103 of the electric component 105 via the lead wire 161, the terminal 160 and the like. This causes a magnetic field to be generated in the stator 103 and the rotor 104 to rotate, thereby causing the shaft 110 fastened to the rotator 104 to rotate.

At this time, the balls 134 roll between the upper race 135 and the lower race 136. Therefore, it becomes possible to suppress a sliding loss of the shaft 110, and reduce torque for rotating the shaft 110. Thus, the electric power supplied to the electric component 105 can be reduced, and hence a higher efficiency of the sealed compressor 100 can be achieved.

According to the rotation of the shaft 110, the piston 126 coupled to the eccentric shaft section 112 via the connecting member 128 reciprocates within the cylinder 117. According to the reciprocation motion of the piston 126, the refrigerant is suctioned into the compression chamber 116 through the cooling cycle, the suction pipe 107 and the suction muffler. The refrigerant is compressed in the compression chamber 116 and then is discharged from the discharge muffler. The refrigerant flows to the cooling cycle through the discharge pipe 108.

[Advantage of Sealed Compressor]

Next, advantages achieved the sealed compressor 100 of Embodiment 1 will be described with reference to FIGS. 1 to 3.

In the sealed compressor 100 of Embodiment 1, the raceway groove 137 having the circular-arc cross-section and the raceway groove 138 having the circular-arc cross-section are formed on the track surface of the upper race 135 and the track surface of the lower race 136, respectively. Because of this, the lubricating oil fed to a region near the thrust ball bearing 132 stays in the raceway groove 138 and is fed to the raceway groove 137 of the upper race 135 by the rotation of the balls 134, so that the lubricating oil is fed stably to the surfaces of the balls 134. In this way, the lubricating oil is fed stably to the portion of the balls 134 and the portion of the upper race 135, which portions are in contact with each other, and the portion of the balls 134 and the portion of the lower race 136, which portions are in contact with each other.

As a result, a sliding loss generated in the thrust ball bearing 132 can be reduced. Thus, it becomes possible to implement the compressor which generates a less noise and has a higher efficiency.

In addition, the limiting means (first limiting means) is able to suppress a deviation between the raceway groove of the upper race 135 and the raceway groove of the lower race 136, which would otherwise impede smooth rolling of the balls 134. Thus, the balls 134 can roll stably.

As compared to the case where the upper race 135 of a flat plate shape or the lower race 136 of a flat plate shape is used, the area of the portion of the balls 134 and the portion of the upper race 135, which portions are in contact with each other, and the area of the portion of the balls 134 the portion of the lower race 136, which portions are in contact with each other, can be increased, and thus a thrust load applied by the rotor 104, the shaft 110, and the like to the contact portions can be dispersed (lessened).

Thus, it becomes possible to suppress a stress from being applied intensively to the portion of the balls 134 and the portion of the upper race 135 or the lower race 136 which portions are in contact with each other.

Even when an impact is exerted during transportation of the sealed compressor 100, and a load is applied excessively in a vertical direction to the portion of the balls 134 and the portion of the upper race 135 or the portion of the lower race 136 which portions are in contact with each other, it becomes possible to suppress a load from being applied to a localized portion of the track surface (raceway groove 137) of the upper race 135 or the track surface (raceway groove 138) of the lower race 136. Because of this, it becomes possible to suppress the balls 134 and the upper race 135 or the lower race 136 from being damaged, deformed, etc. As a result, smooth rotation of the balls 134 can be maintained.

When the piston 126 is applied with a compressive load during a compression process in which the refrigerant is compressed in the compression chamber 116, according to the rotation of the shaft 110, the eccentric shaft section 112 of the shaft 110 coupled via the connecting member 128 is also applied with the compressive load. In a case where HFC refrigerant or the like having a higher density than R600a refrigerant is used as the refrigerant, the load applied to the eccentric shaft section 112 increases.

At this time, because of the clearance formed between the main shaft section 111 of the shaft 110 and the main bearing unit 120 of the cylinder block 114, the shaft 110 sometimes vibrates in the radial direction.

If the clearance formed between the inner peripheral surface of the upper race 135 and the outer peripheral surface of the main shaft section 111 (guide section 115) is great, or a case where an area of a portion of the upper surface of the upper race 135 and a portion of the flange surface 145 which portions are in contact with each other is small, the upper race 135 cannot follow the vibration of the shaft 110 in some cases. In this case, for example, only the center axis of the shaft 110 is displaced, and the upper race 135 is oriented horizontally, leading to a situation in which the center axis of the main shaft section 111 and the center of the raceway groove 137 of the upper race 135 do not conform to each other. This may cause a possibility that the center (center axis) of rotation of the main shaft section 111 deviate from the center of the pitch of the balls 134, the smooth rotation of the balls 134 is impeded, and thereby a sliding loss or a noise is generated.

The area of the portion of the balls 134 and the portion of the raceway groove 137 of the upper race 135, which portions are in contact with each other, and the area of the portion of the balls 134 and the portion of the raceway groove 138 of the lower race 136, which portions are in contact with each other, increase, and a thrust load is dispersed as compared to the case where the raceway grooves are not provided. If the center axis of the upper race 135 and the center axis of the lower race 136 are deviated from each other, friction generated in the contact portions between them increases. For this reason, only the crankshaft 20 is displaced radially due to a vibration, or the like during the operation of the compressor 100, so that the upper race 135 or the lower race 136 tends to be displaced radially with respect to the crankshaft 20.

When the upper race 135 or the lower race 136 is displaced radially with respect to the crankshaft 110 as described above, the center of rotation of the main shaft of the crankshaft 110 and the center of the pitch of the balls 134 are deviated from each other, which increases a sliding loss of the thrust ball bearing 132. As a result, the efficiency of the sealed compressor 100 decreases.

However, in the sealed compressor 100 according to Embodiment 1, the upper race 135, the guide section 115, the cage 133, and the bearing extending section 144 are configured such that the clearance C1 which is the first limiting means is smaller than the clearance C2 or the clearance C3. This can suppress (limit) the upper race 135 from being displaced radially with respect to the shaft 110. Thus, when the shaft 110 vibrates, the upper race 135 is displaced according to the displacement of the shaft 110, thereby suppressing a deviation between the center of rotation of the main shaft section 111 and the center of the pitch of the balls 134. As a result, the smooth rotation of the balls 134 can be maintained, generation of a noise can be suppressed, and a higher efficiency of the sealed compressor 100 can be achieved.

In a case where it is difficult to implement limitation by the clearance C2 and the clearance C3, the clearance C1 may be set to 300 μm or less. In this case, the clearance C1 is able to suppress the radial displacement of the upper race 135, and thus serve as the limiting means (first limiting means).

In the sealed compressor 100 according to Embodiment 1, the upper race 135, the guide section 115, the cage 133, and the bearing extending section 144 are configured such that the clearance C1 is smaller than the clearance C2. Because of this, when the upper race 135 is displaced in a range of the clearance C1, the cage 133 can be prevented from contacting another member (e.g., bearing extending section 144), and a sliding loss generated due to the contact with the cage 133, the bearing extending section 144, or the like can be suppressed. Thus, efficiency and reliability of the thrust ball bearing 132 can be improved.

In the sealed compressor 100 according to Embodiment 1, the upper race 135, the guide section 115, the lower race 136, and the bearing extending section 144 are configured such that the clearance C1 is smaller than the clearance C3. Because of this, when the upper race 135 is displaced in a range of the clearance C1, the lower race 136 can be prevented from contacting another member (e.g., bearing extending section 144), and a sliding loss generated due to the contact with the lower race 136, the bearing extending section 144, or the like can be suppressed. Thus, efficiency and reliability of the thrust ball bearing 132 can be improved.

In the sealed compressor 100 according to Embodiment 1, the bearing extending section 144 is provided on the thrust surface 130 such that it extends in the direction of the center axis C of the main shaft section 111. Thus, when the compressive load applied to the piston 126 during the compression process is applied to the eccentric shaft section 112 of the shaft 110 via the connecting member 128, the bearing extending section 144 can reduce a distance from a point Y at which the compressive load is applied to a point X at which a bending stress is applied (see FIG. 1). This makes it possible to suppress a bending stress from being applied excessively to the main shaft section 111 or to the main bearing unit 120, and suppress the main shaft section 111 from being displaced radially, due to the vibration of the shaft 110.

In the sealed compressor 100 according to Embodiment 1, the cage 133 and the lower race 136 are disposed outward relative to the bearing extending section 144. Thus, since the inner peripheral surface of the cage 133 and the inner peripheral surface of the lower race 136 do not contact the outer peripheral surface of the main shaft section 111, a sliding loss which would be caused by the contact with the main shaft section 111 can be avoided.

In the sealed compressor 100 according to Embodiment 1, the upper race 135 is configured such that its outer diameter dimension is greater than an outer diameter dimension of the thrust surface 130 of the shaft 110, and its inner diameter dimension is smaller than an outer diameter dimension of the bearing extending section 144. Because of this, an area of a portion of the upper main surface of the upper race 135 and a portion of the thrust surface 130 which portions are in contact with each other can be increased, and friction (friction torque) generated between the upper race 135 and the thrust surface 130 can be increased. This makes it possible to suppress the upper race 135 from being displaced in the radial direction and in a circumferential direction with respect to the shaft 110, due to the vibration of the shaft 110.

Therefore, it becomes possible to prevent the upper race 135 from sliding on the flange surface 145 of the shaft 110, which allows the upper race 135 and the shaft 110 to rotate together. As a result, generation of a noise can be suppressed, and a higher efficiency of the sealed compressor 100 can be achieved.

Although in the sealed compressor 100 according to Embodiment 1, the compression component 106 is positioned above the electric component 105, the compression component 106 may be positioned below the electric component 105.

Although in Embodiment 1, the main bearing unit 120 is provided with the bearing extending section 144, it may not be provided with the bearing extending section 144.

In the sealed compressor of Embodiment 1, the limiting means (first limiting means) may be configured to limit a vertical displacement of the upper race with respect to the shaft, as will be described as another embodiment.

Although in the sealed compressor according to Embodiment 1, the limiting means (first limiting means) may be provided between the outer peripheral surface of the main shaft section and the inner peripheral surface of the upper race, as will be described as another embodiment.

In the sealed compressor according to Embodiment 1, the bearing extending section may be provided on the thrust surface of the main bearing unit such that it extends in the axial direction of the main shaft section, and its inner peripheral surface faces the outer peripheral surface of the main shaft section, the cage and the lower race may be disposed such that their inner peripheral surfaces face the outer peripheral surface of the bearing extending section, and the first clearance may be smaller than the clearance formed between the outer peripheral surface of the bearing extending section and the inner peripheral surface of the cage.

In the sealed compressor according to Embodiment 1, the bearing extending section may be provided on the thrust surface of the main bearing unit such that it extends in the axial direction of the main shaft section, and its inner peripheral surface faces the outer peripheral surface of the main shaft section, the cage and the lower race may be disposed such that their inner peripheral surfaces face the outer peripheral surface of the bearing extending section, and the first clearance may be smaller than the clearance formed between the outer peripheral surface of the bearing extending section and the inner peripheral surface of the lower race.

In the sealed compressor according to Embodiment 1, the clearance formed between the outer peripheral surface of the bearing extending section and the inner peripheral surface of the cage may be greater than the clearance formed between the outer peripheral surface of the bearing extending section and the inner peripheral surface of the lower race.

Embodiment 2

In a sealed compressor according to Embodiment 2, the first limiting means comprises a fastening means which inhibits the upper race from being displaced radially with respect to the main shaft section.

In the present embodiment, only differences from the configurations and technical ideas described in detail in the above embodiments will be described, and the same components as those described in detail in the above embodiments, or components which will not cause any problems even when the same technical ideas are applied, may be combined with the present embodiment, and will not be described in detail repeatedly.

Hereinafter, an exemplary sealed compressor according to Embodiment 2 will be described with reference to FIG. 4.

Figure 4:
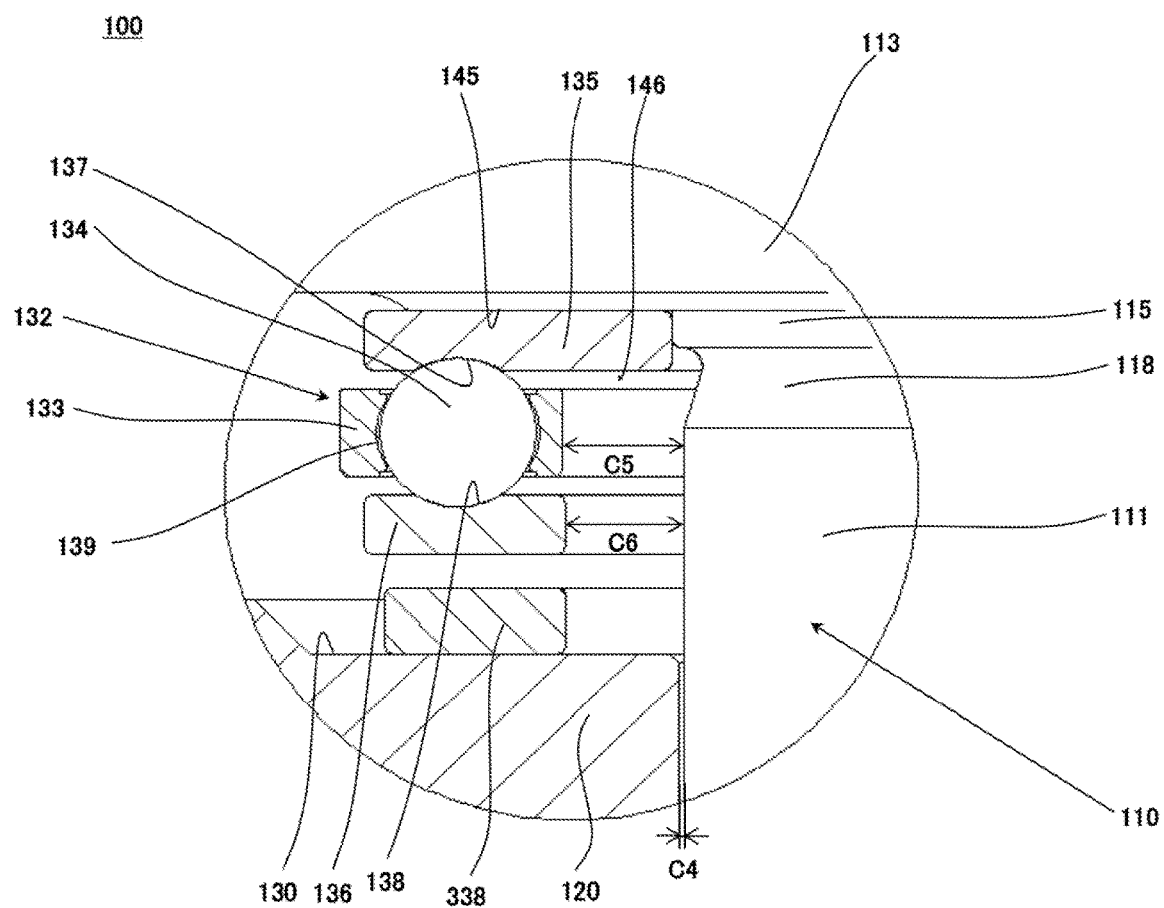
FIG. 4 is a view schematically showing major components of a sealed compressor according to Embodiment 2, in an enlarged manner.

FIG. 4 is a view schematically showing major components of a sealed compressor according to Embodiment 2, in an enlarged manner. In FIG. 4, upper and lower sides of the sealed compressor are depicted as upper and lower sides in FIG. 4.

Referring to FIG. 4, the sealed compressor 100 according to Embodiment 2 has basically the same configuration as that of the sealed compressor 100 according to Embodiment 1, except that the limiting means comprises the fastening means as the first limiting means which suppresses the radial displacement, the main bearing unit 120 is not provided with the bearing extending section 144, and a wave washer 338 is disposed between the lower race 136 and the thrust surface 130.

The upper race 135 has an inner diameter dimension which is slightly smaller than an outer diameter dimension of the guide section 115. The upper race 135 is pressed into and fastened to the guide section 115. That is, the inner peripheral surface of the upper race 135 and the outer peripheral surface (guide section 115) of the main shaft section 111 are fitted together, thereby forming the fastening means.

The wave washer 338 has a ring shape (disc shape having an opening in a center section) when viewed from the vertical direction, and elastically supports the thrust ball bearing 132. This makes it possible to reduce a thrust load applied by the shaft 110, the rotor 104, and the like to the raceway groove 137, the balls 134, and the raceway groove 138 of the thrust ball bearing 132.

In the sealed compressor 100 according to Embodiment 2 configured as described above, the clearance C1 formed between the inner peripheral surface of the upper race 135 and the guide section 115 is zero (the clearance C1 is not provided). In other words, the radial displacement of the upper race 135 with respect to the main shaft section 111 does not occur. When the main shaft section 111 is displaced radially according to the vibration of the shaft 110, the upper race 135 can be displaced radially according to the displacement of the main shaft section 111. Therefore, according to the displacement of the main shaft section 111, the center of the raceway groove 137 of the upper race 135 is displaced. This makes it possible to suppress a deviation between the center of rotation of the main shaft section 111 and the center of the pitch of the balls 134.

Since the thrust surface 130 of the main bearing unit 120 is not provided with the bearing extending section 144, a clearance C5 formed between the inner peripheral surface of the cage 133 and the outer peripheral surface of the main shaft section 111 is set greater than the clearance C2 of Embodiment 1. Likewise, a clearance C6 formed between the inner peripheral surface of the lower race 136 and the outer peripheral surface of the main shaft section 111 is greater than the clearance C3 of Embodiment 1. The clearance C5 formed between the inner peripheral surface of the cage 133 and the outer peripheral surface of the main shaft section 111 is greater than the clearance C6 formed between the inner peripheral surface of the lower race 136 and the outer peripheral surface of the main shaft section 111.

In this structure, even when the upper race 135 is displaced according to the radial displacement of the main shaft section 111, the cage 133 is displaced easily according to the displacement of the upper race 135. This makes it possible to suppress a deviation between the center of rotation of the main shaft section 111 and the center of the pitch of the balls 134.

As a result, in the sealed compressor 100 according to Embodiment 2, the smooth rotation of the balls 134 can be maintained, generation of a noise can be suppressed, and a higher efficiency of the sealed compressor 100 can be achieved Although in Embodiment 2, the upper race 135 is pressed into and fastened to the guide section 115 as the fastening means, it may be fastened to the guide section 115 by an adhesive.

Although in Embodiment 2, the main bearing unit 120 is not provided with the bearing extending section 144, it may be provided with the bearing extending section 144. Although in Embodiment 2, the wave washer 338 is provided between the lower race 136 and the thrust surface 130, the lower race 136 may be disposed to contact the thrust surface 130 (the wave washer 338 is not provided).

Although in the sealed compressor 100 of Embodiment 2, the upper race 135 is pressed into and fastened to the guide section 115, it may be pressed into the main shaft section, and the fastening means may be formed by fitting between the inner peripheral surface of the upper race 135 and the outer peripheral surface of the main shaft section.

Although in the sealed compressor 100 of Embodiment 2, the clearance C5 formed between the inner peripheral surface of the cage and the outer peripheral surface of the main shaft section is greater than the clearance C6 formed between the inner peripheral surface of the lower race 136 and the outer peripheral surface of the main shaft section, the clearance C5 may be smaller than the clearance C6.

Embodiment 3

In a sealed compressor of Embodiment 3, the fastening means comprises an adjustment member (elastic means) provided between the outer peripheral surface of the main shaft section and the inner peripheral surface of the upper race.

In the present embodiment, differences from the configurations and technical ideas described in detail in the above embodiments will be described, and the same components as those described in detail in the above embodiments, or components which will not cause any problems even when the same technical ideas are applied, may be combined with the present embodiment, and will not be described in detail repeatedly.

Hereinafter, an exemplary sealed compressor according to Embodiment 3 will be described with reference to FIGS. 5 and 6.

Figure 5:
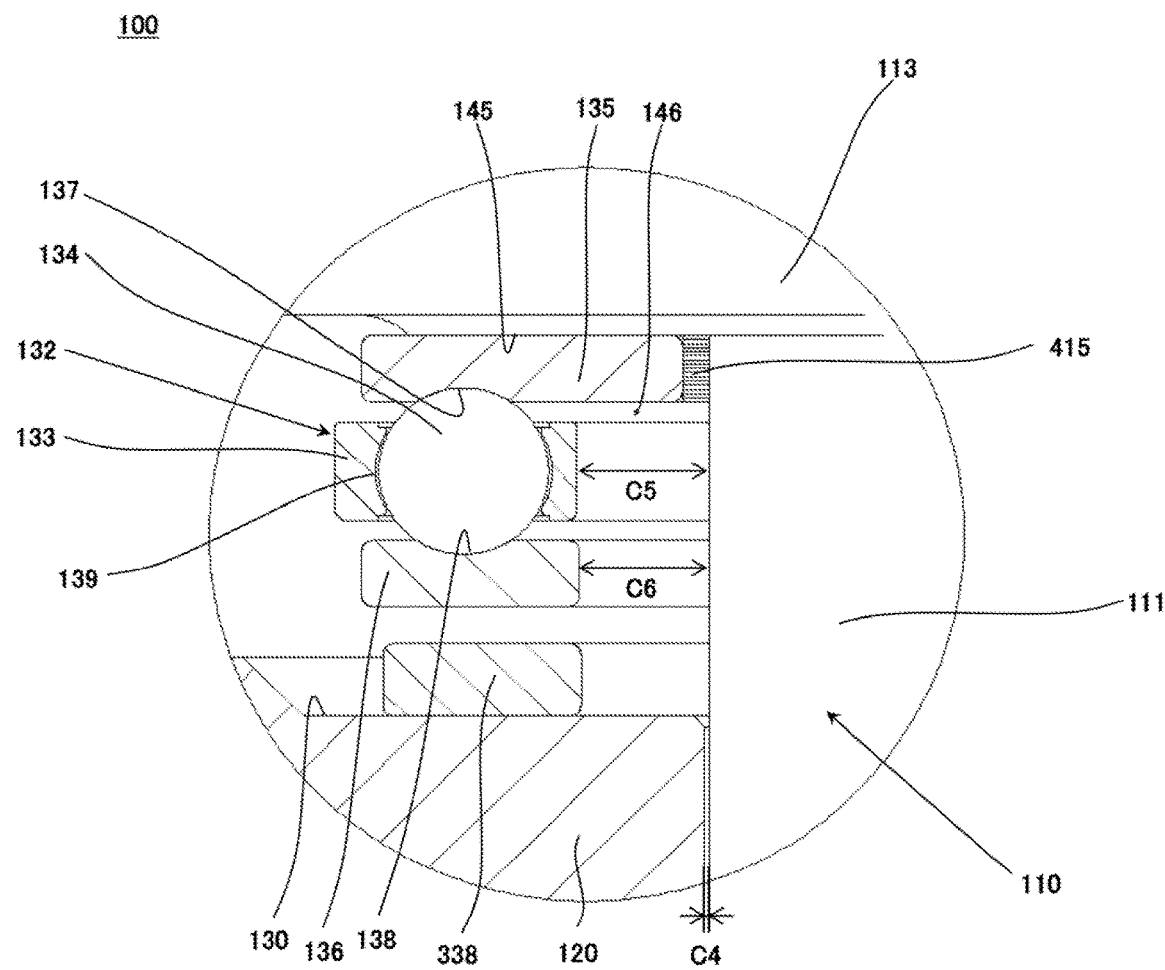
FIG. 5 is a view schematically showing major components of a sealed compressor according to Embodiment 3, in an enlarged manner.

FIG. 5 is a view schematically showing major components of the sealed compressor according to Embodiment 3, in an enlarged manner. FIG. 6 is a view schematically showing a structure of an adjustment member in the sealed compressor of FIG. 5. In FIG. 5, upper and lower sides of the sealed compressor are depicted as upper and lower sides in FIG. 5.

Figure 6:
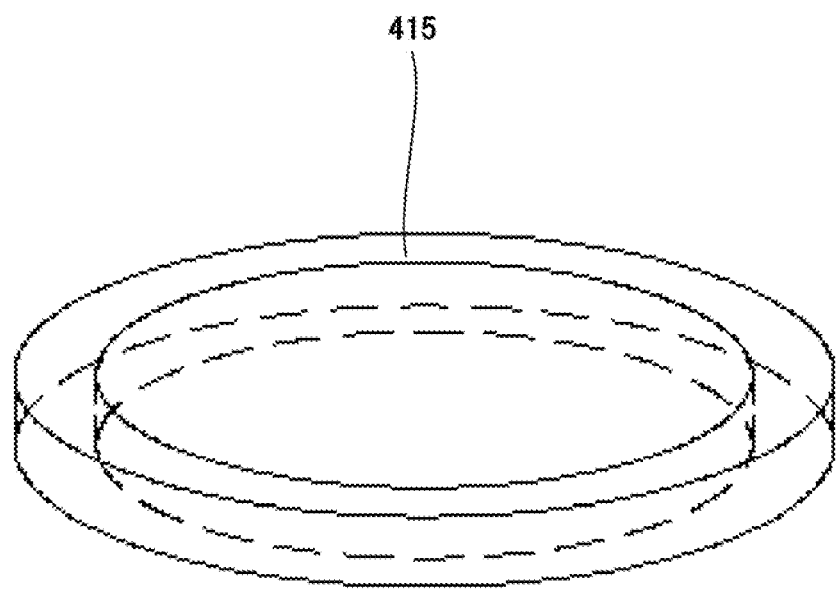
FIG. 6 is a view schematically showing a structure of an adjustment member in the sealed compressor of FIG. 5.

Referring to FIGS. 5 and 6, the sealed compressor 100 according to Embodiment 3 has basically the same configuration as that of the sealed compressor 100 according to Embodiment 1, except that the fastening means as the first limiting means comprises an adjustment member (elastic member) 415. More specifically, the sealed compressor 100 according to Embodiment 3 is different from the sealed compressor 100 according to Embodiment 1 in that the adjustment member (elastic member) 415 is provided between the outer peripheral surface of the main shaft section 111 and the inner peripheral surface of the upper race 135, the bearing extending section 144, the guide section 115 and the recess 118 are not provided, and the wave washer 338 is disposed between the lower race 136 and the thrust surface 130.

The adjustment member (elastic member) 415 has a ring shape in which a center of its outer diameter and a center of its inner diameter are concentric with the center axis of the main shaft section 111, when viewed from the vertical direction. The adjustment member 415 may be made of a resin such as Teflon (registered mark), or the like having a self-lubricating property. The adjustment member 41 is pressed into the upper end portion of the man shaft portion 111 or fastened to it by an adhesive.

In the sealed compressor 100 according to Embodiment 3 configured as described above, the upper race 135 is fastened to the main shaft section 111 via the adjustment member 415. That is, the adjustment member 415 can inhibit or lessen a radial displacement of the upper race 135 with respect to the main shaft section 111. In this structure, when the shaft 110 vibrates and the main shaft section 111 is displaced radially, the upper race 135 is displaced radially according to the displacement of the main shaft section 111. As a result, the smooth rotation of the balls 134 can be maintained, generation of a noise can be suppressed, and a higher efficiency of the sealed compressor 100 can be achieved.

Although in Embodiment 3, the main bearing unit 120 is not provided with the bearing extending section 144, it may be provided with the bearing extending section 144.

Although in Embodiment 3, the wave washer 338 is provided between the lower race 136 and the thrust surface 130, the lower race 136 may be disposed to contact the thrust surface 130 (the wave washer 338 is not provided).

Embodiment 4

In the sealed compressor 100 according to Embodiment 4, the first limiting means comprises an engagement means for engaging the main shaft section and the upper race with each other.

In the present embodiment, differences from the configurations and technical ideas described in detail in the above embodiments will be described, and the same components as those described in detail in the above embodiments, or components which will not cause any problems even when the same technical ideas are applied, may be combined with the present embodiment, and will not be described in detail repeatedly.

In the sealed compressor according to Embodiment 4, the compression component is positioned above the electric component, the shaft has a connecting section for connecting the main shaft section to the eccentric shaft section, the connecting section is provided with a flange surface contacting the other main surface of the upper race, and the engagement means includes a first engagement section formed on the flange surface and a second engagement section formed on the other main surface of the upper race to be engageable with the first engagement section.

Hereinafter, an exemplary sealed compressor according to Embodiment 4 will be described with reference to FIGS. 7 to 11.

Figure 7:
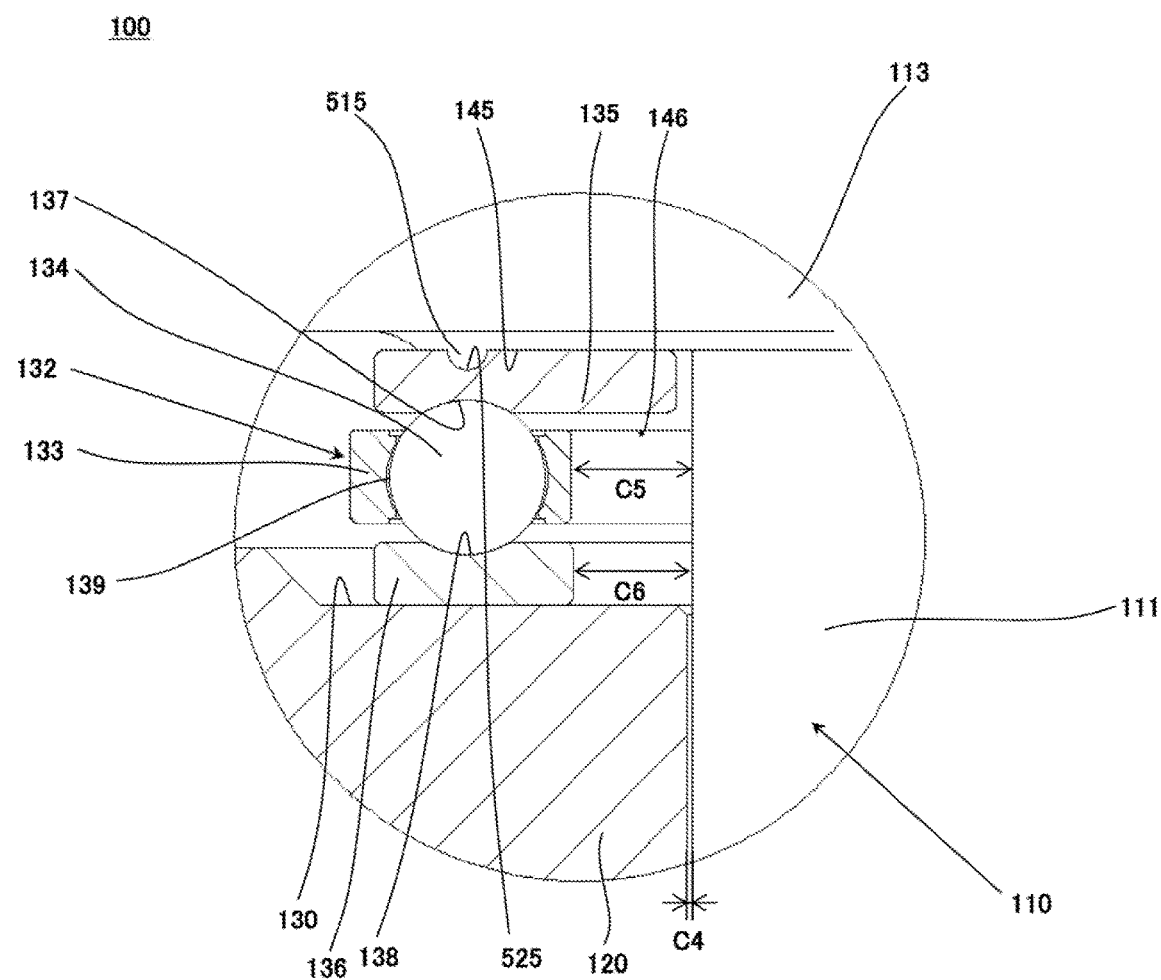
FIG. 7 is a view schematically showing major components of a sealed compressor according to Embodiment 4, in an enlarged manner.
Figure 8:
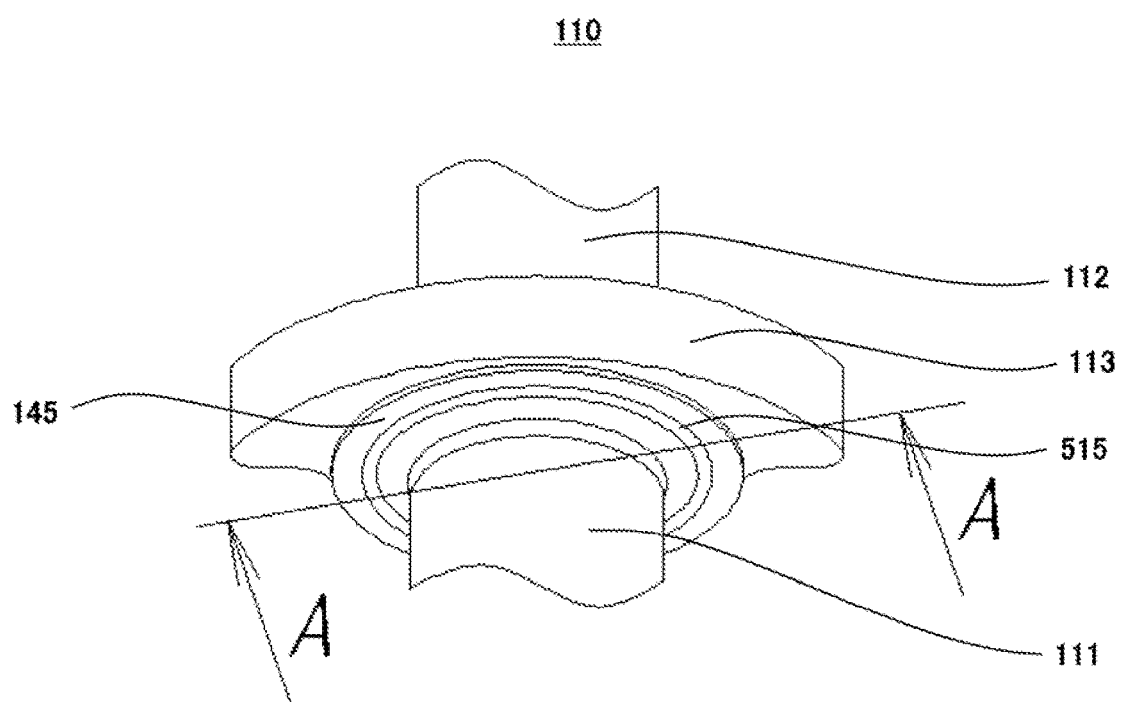
FIG. 8 is a view schematically showing a configuration of a shaft of the sealed compressor of FIG. 7.
Figure 9:
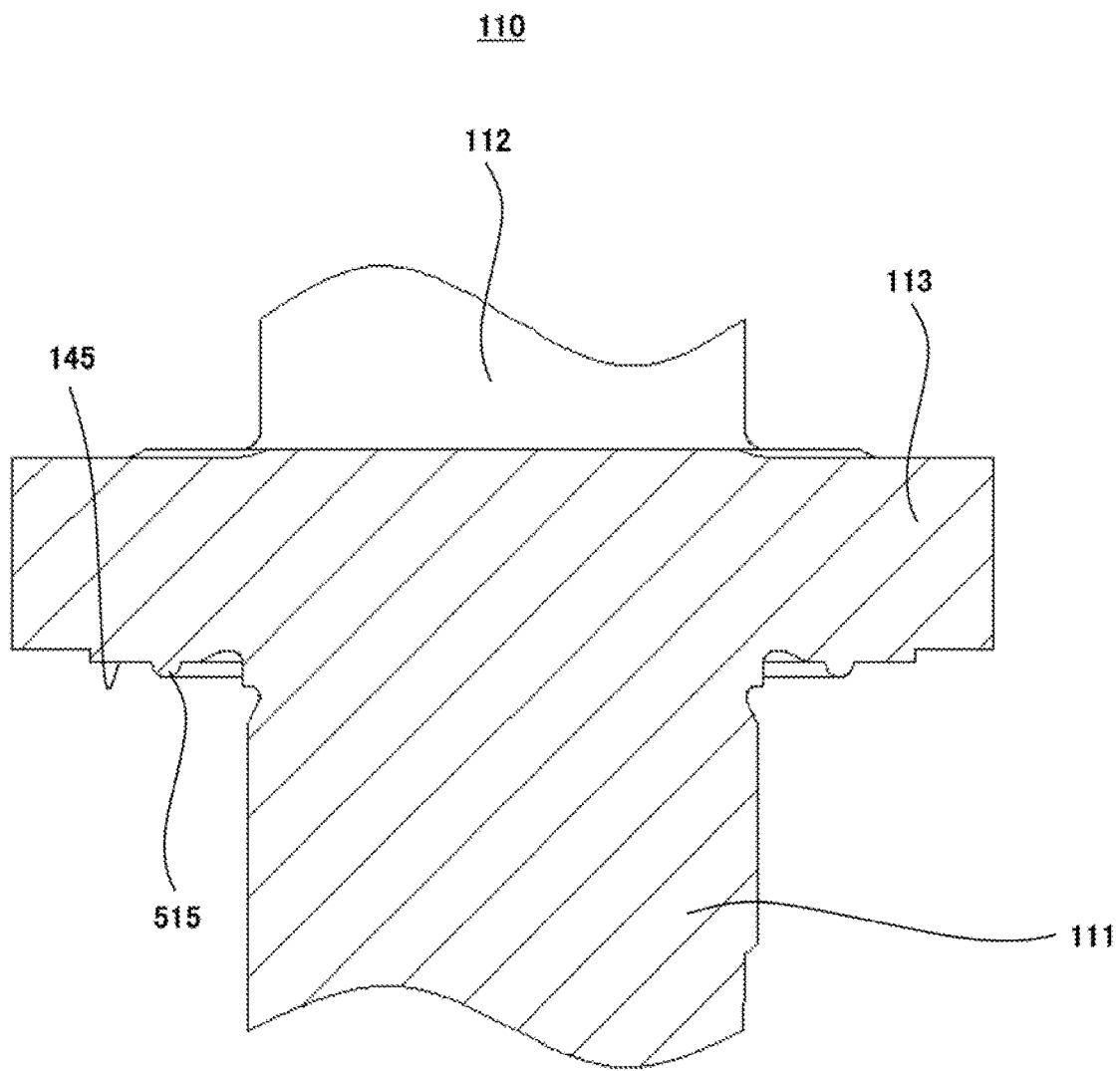
FIG. 9 is a cross-sectional view taken along line A-A of FIG. 8.
Figure 10:
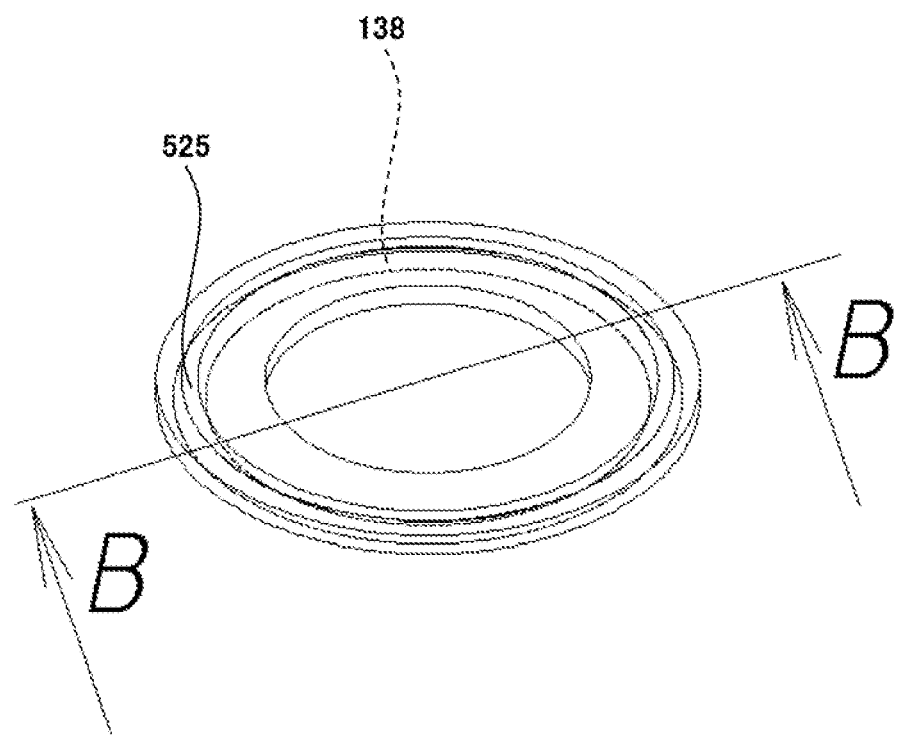
FIG. 10 is a view schematically showing a configuration of an upper race of the sealed compressor of FIG. 7.
Figure 11:
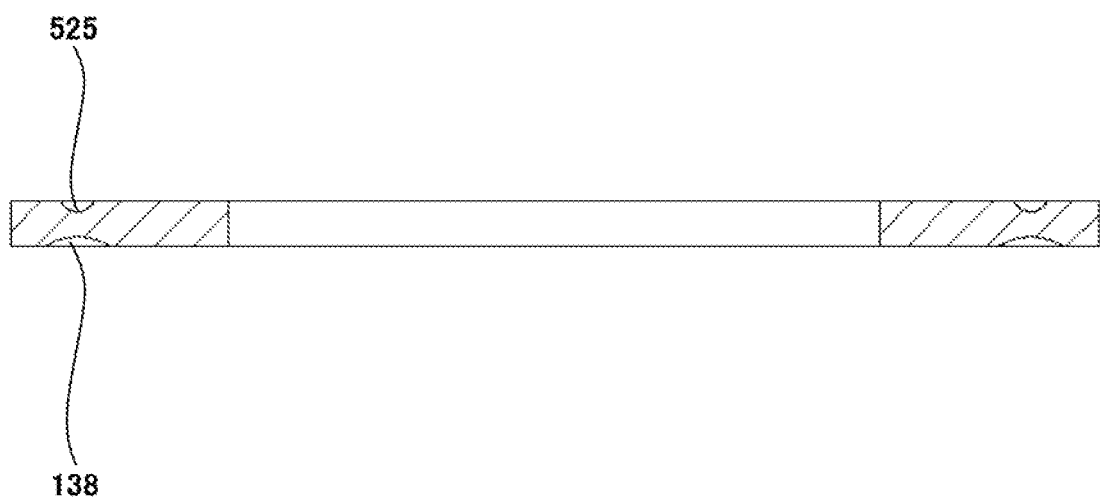
FIG. 11 is a cross-sectional view taken along line B-B of FIG. 10.

FIG. 7 is a view schematically showing major components of the sealed compressor according to Embodiment 4, in an enlarged manner. FIG. 8 is a view schematically showing a configuration of a shaft of the sealed compressor of FIG. 7. FIG. 9 is a cross-sectional view taken along line A-A of FIG. 7. FIG. 10 is a view schematically showing a configuration of an upper race of the sealed compressor of FIG. 7. FIG. 11 is a cross-sectional view taken along line B-B of FIG. 10. In FIG. 7, upper and lower sides of the sealed compressor are depicted as upper and lower sides in FIG. 7.

Referring to FIGS. 7 to 11, the sealed compressor 100 according to Embodiment 4 has basically the same configuration as that of the sealed compressor 100 according to Embodiment 1, except that the limiting means comprises the first limiting means which limits a radial displacement and which is engagement in the vertical direction. More specifically, the first limiting means is formed by engagement between the thrust surface 130 of the shaft 110 and the upper main surface of the upper race 135. More specifically, the first limiting means comprises an engagement means including a first engagement section 515 and a second engagement section 525.

The sealed compressor 100 according to Embodiment 4 is different from the sealed compressor 100 according to Embodiment 1 in that the bearing extending section 144, the guide section 115 and the recess 118 are not provided.

The first engagement section 515 protrudes downward from the thrust surface 130 and has a ring shape when viewed from the vertical direction. The first engagement section 515 has a circular-arc cross section in the vertical direction. The second engagement section 525 comprises an annular groove, and has a circular-arc cross section in the vertical direction to be similar to that of the first engagement section 515. The first engagement section 515 and the second engagement section 525 overlap with each other in the vertical direction.

The upper race 135 is fastened to (engaged with) the shaft 110 in such a manner that the first engagement section 515 and the second engagement section 525 are fitted to each other. Alternatively, the upper race 135 may be fastened to the shaft 110 by pressing the second engagement section 525 into the first engagement section 515, or by means of an adhesive.

In the sealed compressor 100 according to Embodiment 4 configured as described above, since the upper race 135 is fastened to the shaft 110 (the upper race 135 and the shaft 110 are engaged with each other), the upper race 135 is displaced according to the displacement of the shaft 110. Since the center of the raceway groove 137 of the upper race 135 is displaced according to the displacement of the main shaft section 111, it becomes possible to suppress a deviation between the center of rotation of the main shaft section 111 and the center of the pitch of the balls 134. As a result, the smooth rotation of the balls 134 can be maintained, generation of a noise can be suppressed, and a higher efficiency of the sealed compressor 100 can be achieved.

Although in Embodiment 4, the upper race 135 is fastened to the shaft 110 by fitting the first engagement section 515 and the second engagement section 525 to each other, the present invention is not limited to this.

For example, a clearance may be provided between the first engagement section 515 and the second engagement section 525 such that this clearance is smaller than the clearance C4 formed between the inner peripheral surface of the bearing extending section 144 and the outer peripheral surface of the main shaft section 111. By configuring the first engagement section 515 and the second engagement section 525 in this way, it becomes possible to suppress (limit) the upper race 135 from being displaced radially with respect to the shaft 110.

Therefore, when the shaft 110 vibrates, the upper race 135 is displaced according to the displacement of the shaft 110, thereby suppressing a deviation between the center of rotation of the main shaft section 111 and the center of the pitch of the balls 134. As a result, the smooth rotation of the balls 134 can be maintained, generation of a noise can be suppressed, and a higher efficiency of the sealed compressor 100 can be achieved.

Although in Embodiment 4, the first engagement section 515 has a convex shape and the second engagement section 525 has a recessed shape, the first engagement section 515 may have a recessed shape and the second engagement section 525 may have a convex shape.

Although in Embodiment 4, the limiting means includes the first engagement section 515 and the second engagement section 525, it may include, for example, a combination of the limiting means (first limiting means) of Embodiment 1 to Embodiment 3 and the first engagement section 515 and the second engagement section 525.

Although in Embodiment 4, the main bearing unit 120 is not provided with the bearing extending section 144, it may be provided with the bearing extending section 144. Although in Embodiment 4, the lower race 136 is disposed to contact the thrust surface 130, the wave washer 338 may be provided between the lower race 136 and the thrust surface 130.

Modified Example 1

Next, Modified example of the sealed compressor 100 according to Embodiment 4 will be described.

In a sealed compressor according to Modified example 1 of Embodiment 4, the compression component is positioned below the electric component, the rotor includes a stack in which a plurality of steel plates are stacked together, and a first member and a second member which sandwich the stack, the second member is provided with a flange surface which contacts the other main surface of the upper race, and the engagement means includes the first engagement section formed on the flange surface and the second engagement section formed on the other main surface of the upper race to be engageable with the first engagement section.

Hereinafter, an exemplary sealed compressor according to Modified example 1 of Embodiment 4 will be described with reference to FIGS. 12 and 13.

Figure 12:
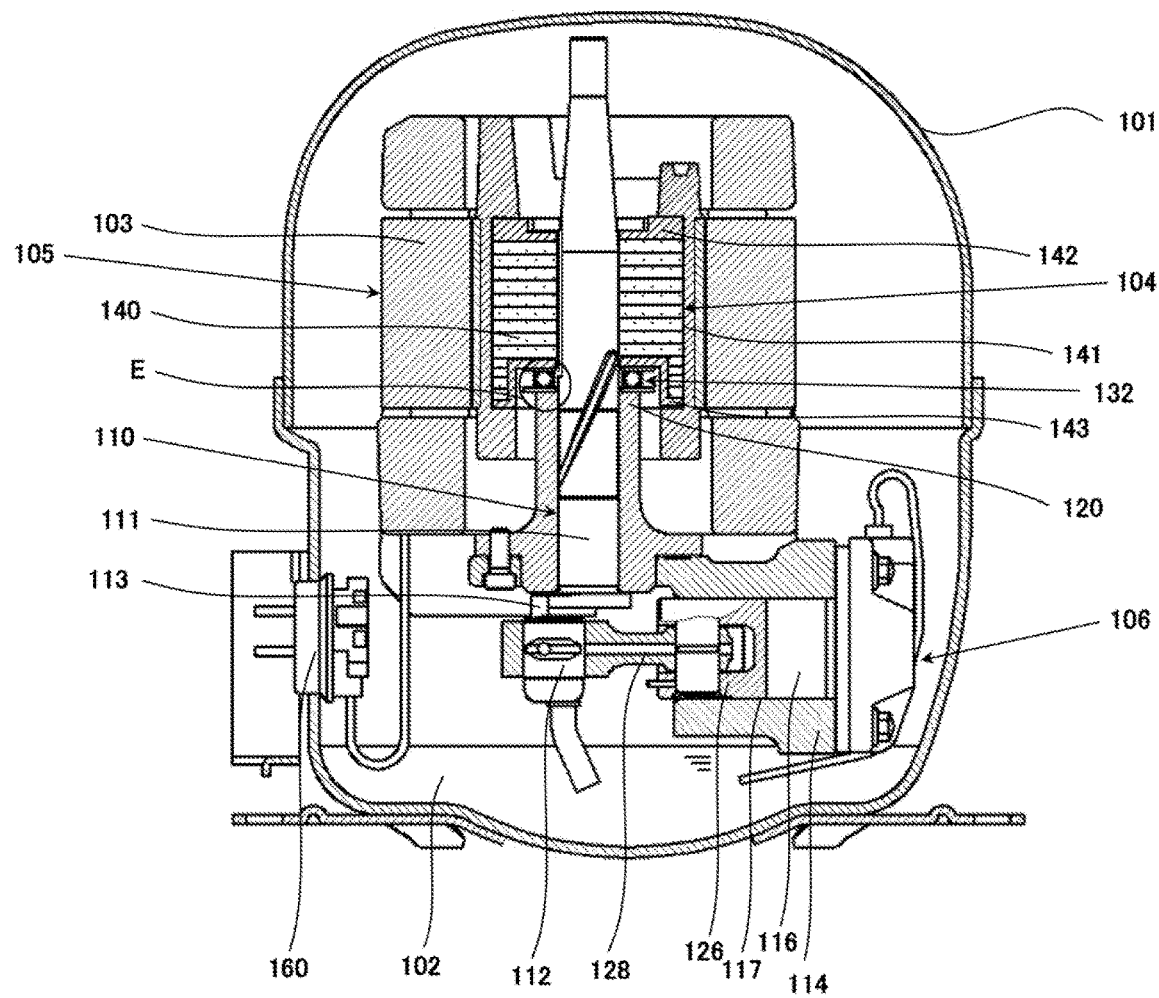
FIG. 12 is a longitudinal sectional view of a sealed compressor according to Modified example 1 of Embodiment 4.

FIG. 12 is a longitudinal sectional view of a sealed compressor according to Modified example 1 of Embodiment 4. FIG. 13 is view schematically showing a region E of FIG. 12, in an enlarged manner. In FIG. 12, a portion of the components and members constituting the sealed compressor is omitted. In FIGS. 12 and 13, upper and lower sides of the sealed compressor are depicted as upper and lower sides in FIGS. 12 and 13.

Figure 13:
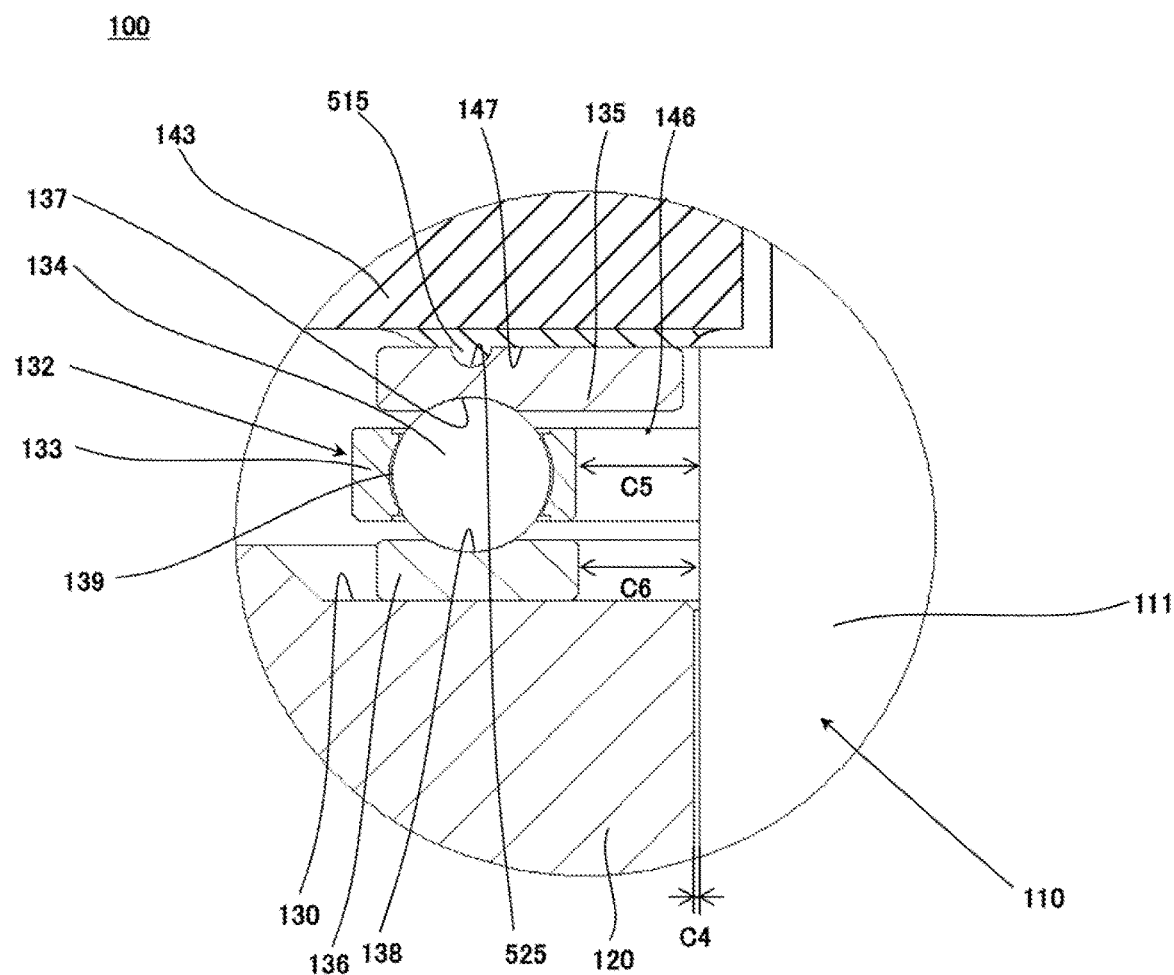
FIG. 13 is view schematically showing a region E of FIG. 12, in an enlarged manner.

Referring to FIGS. 12 and 13, the sealed compressor 100 according to Modified example 1 has basically the same configuration as that of the sealed compressor 100 according to Embodiment 4, except that the compression component 106 is positioned below the electric component 105, the second member 143 constituting the rotor 104 is provided with the flange surface 147, and the flange surface 147 is provided with the first engagement section 515.

The second member 143 includes a ring-shaped first plate portion, a ring-shaped second plate portion, and a tubular portion connecting the first plate portion to the second plate portion. More specifically, the first plate portion has a shape in which its inner diameter is slightly greater than the inner diameter of the main shaft section 111 of the shaft 110 and an area of its main surface is greater than an area of a main surface of the second plate portion. The second plate portion has a shape in which its inner diameter is equal to an outer diameter of the first plate portion and its outer diameter is greater than an outer diameter of the first plate portion. And, the tubular portion connects an outer peripheral portion of the first plate portion to an inner peripheral portion of the second plate portion.

The second member 143 is provided with a ring-shaped flange surface 147 on a lower main surface of the first plate portion, when viewed from the vertical direction. The flange surface 147 has a shape in which its inner diameter is smaller than the inner diameter of the upper race 135 and its outer diameter is smaller than the outer diameter of the upper race 135. The first engagement section 515 is provided on the flange surface 147.

In the sealed compressor 100 according to Modified example 1 of Embodiment 4 configured as described above, since the upper race 135 is fastened to the rotor 104, the upper race 135 is displaced radially according to the displacement of the shaft 110. Since the center of the raceway groove 137 of the upper race 135 is displaced according to the displacement of the main shaft section 111, it becomes possible to suppress a deviation between the center of rotation of the main shaft section 111 and the center of the pitch of the balls 134. As a result, the smooth rotation of the balls 134 can be maintained, generation of a noise can be suppressed, and the efficiency of the sealed compressor 100 can be achieved.

Although in Modified example 1 of Embodiment 4, the main bearing unit 120 is not provided with the bearing extending section 144, it may be provided with the bearing extending section 144. Although in Modified example 1 of Embodiment 4, the lower race 136 is disposed to contact the thrust surface 130, the wave washer 338 may be provided between the lower race 136 and the thrust surface 130.

In the sealed compressor 100 of Modified example 1 of Embodiment 4, the compression element is positioned below the electric component, and therefore, the sealed compressor of Modified example 1 may be combined with the limiting means (first limiting means) of Embodiment 1 to Embodiment 3.

Embodiment 5

In a sealed compressor according to Embodiment 5, the first limiting means comprises an engagement means for engaging the main shaft section and the upper race to each other.

In the sealed compressor according to Embodiment 5, the engagement means includes a third engagement section having a recess shape on the outer peripheral surface of the main shaft section and a fourth engagement section having a convex shape on the inner peripheral surface of the upper race, or a third engagement section having a convex shape on the outer peripheral surface of the main shaft section and a fourth engagement section having a recess shape on the inner peripheral surface of the upper race, the third engagement section and the fourth engagement section are similar to each other, and the main shaft section and the upper race are disposed such that the third engagement section and the fourth engagement section are engageable with each other.

In the present embodiment, differences from the configurations and technical ideas described in detail in the above embodiments will be described, and the same components as those described in detail in the above embodiments, or components which will not cause any problems even when the same technical ideas are applied, may be combined with the present embodiment, and will not be described in detail repeatedly.

Hereinafter, an exemplary sealed compressor according to Embodiment 5 will be described with reference to FIGS. 14 to 16.

Figure 14:
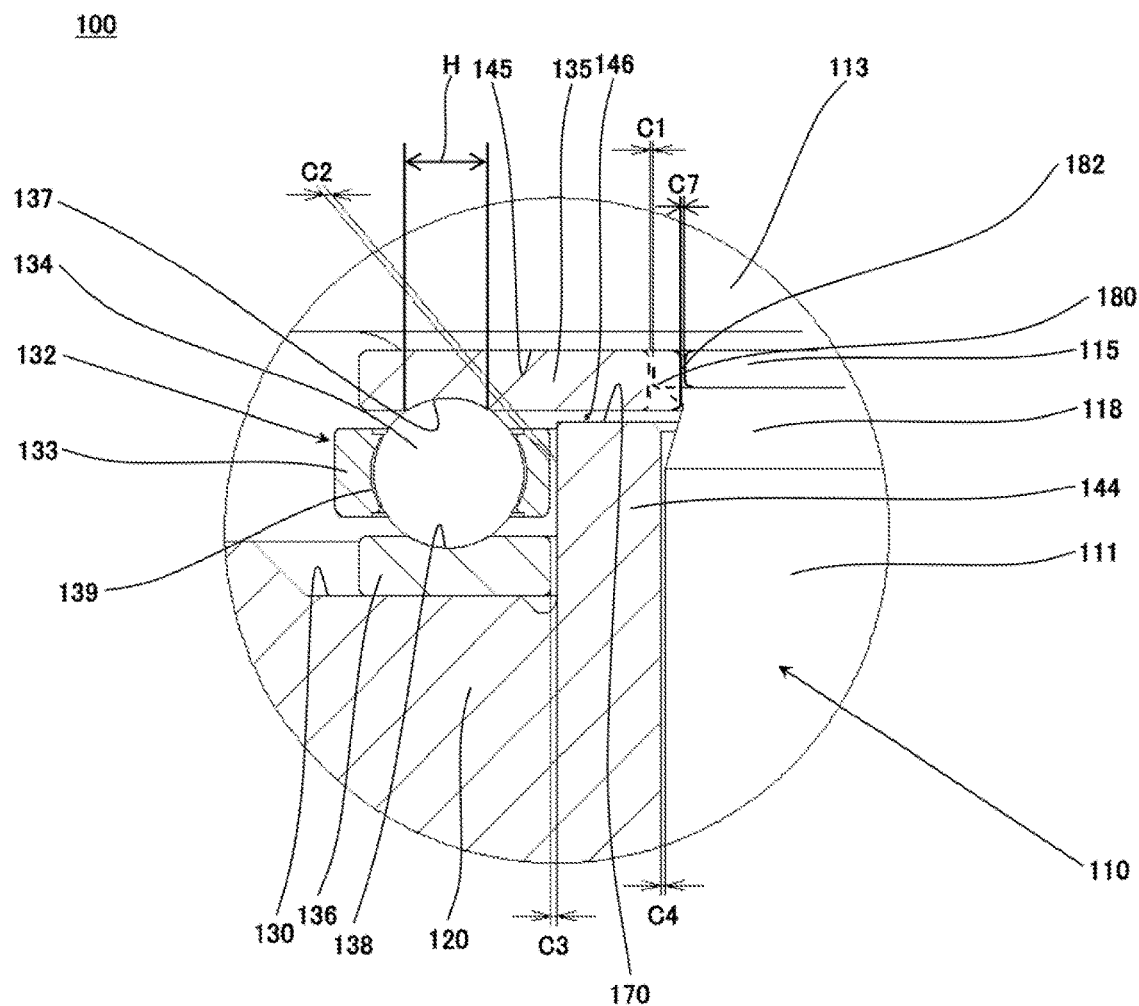
FIG. 14 is a view schematically showing major components of a sealed compressor according to Embodiment 5, in an enlarged manner.

FIG. 14 is a view schematically showing major components of a sealed compressor according to Embodiment 5, in an enlarged manner. FIG. 15 is a view schematically showing a configuration of a shaft of the sealed compressor of FIG. 14. FIG. 16 is a view schematically showing a configuration of an upper race of the sealed compressor of FIG. 14. In FIG. 14, upper and lower sides of the sealed compressor are depicted as upper and lower sides in FIG. 14.

Figure 15:
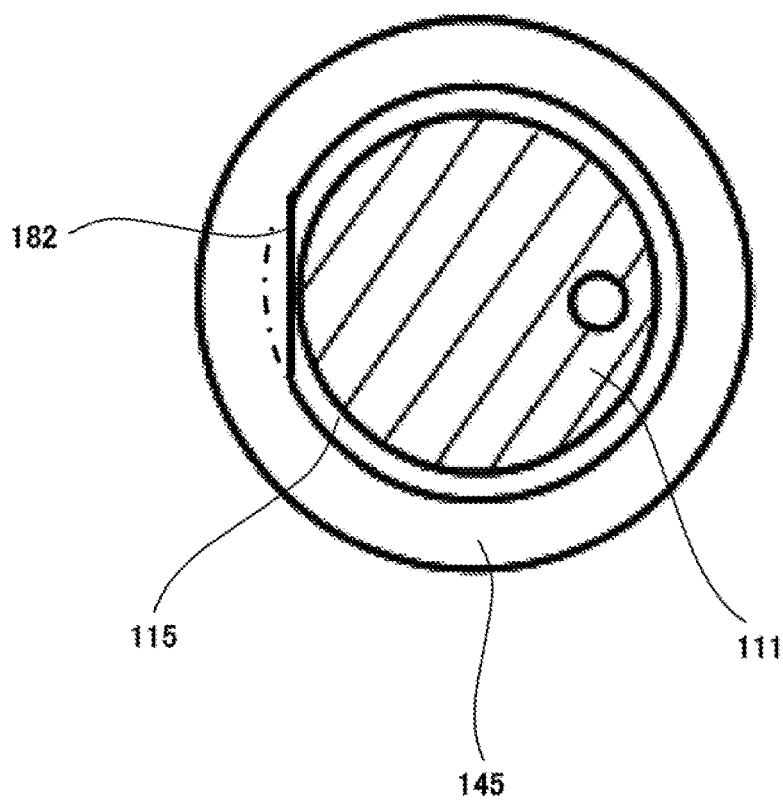
FIG. 15 is a view schematically showing a configuration of a shaft of the sealed compressor of FIG. 14.
Figure 16:
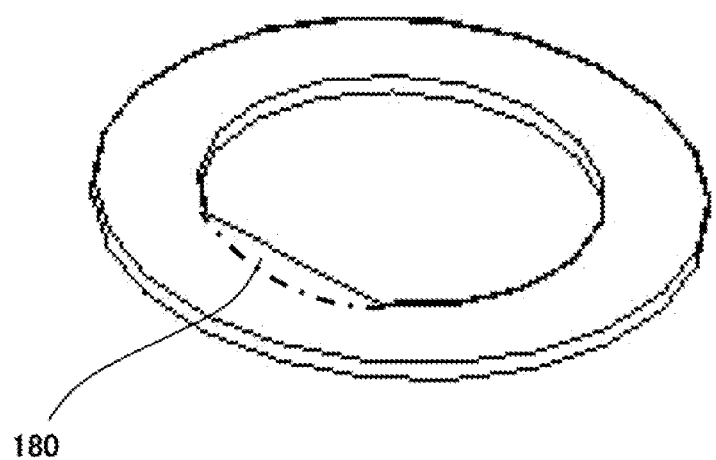
FIG. 16 is a view schematically showing a configuration of an upper race of the sealed compressor of FIG. 14.

Referring to FIGS. 14 to 16, the sealed compressor 100 according to Embodiment 5 has basically the same configuration as that of the sealed compressor 100 according to Embodiment 1, except for the followings. The limiting means is the first limiting means configured to suppress the upper race from being displaced radially with respect to the shaft, and is horizontal engagement. Specifically, the first limiting means is defined by the main shaft section 111 of the shaft 110 and the inner peripheral surface of the upper race 135. More specifically, the engagement means includes a third engagement section 182 provided on the upper end portion of the main shaft section 111 of the shaft 110 and a fourth engagement section 180 provided on the inner peripheral surface of the upper race 135.

The third engagement section 182 is a portion formed by cutting out a portion of the outer peripheral surface of the main shaft section 111 in the vertical direction (hollow portion of the outer peripheral surface of the main shaft section 111) on the upper end portion of the main shaft section 111 (including the guide section 115). In other words, the third engagement section 182 is formed by a portion (flat hollow portion having an area) which is recessed inward from the outer peripheral surface of the main shaft section 111. That is, the third engagement section 182 is formed as a portion which is recessed inward from the outer peripheral surface (one-dotted line in FIG. 15) of the main shaft section 111 such that the outer peripheral surface of the main shaft section 111 does not have a simple circular-arc shape.

The fourth engagement section 180 is formed by a portion (flat surface portion having an area) protruding inward from the inner peripheral surface of the upper race 135. Specifically, the fourth engagement section 180 has a convex shape protruding inward from the inner peripheral surface (one-dotted line in FIG. 16) of the upper race 135 such that the inner peripheral surface of the upper race 135 does not have a simple circular-arc shape.

The third engagement section 182 and the fourth engagement section 180 are similar to each other when viewed from the vertical direction such that they are engageable with each other. The upper race 135 is disposed such that the fourth engagement section 180 and the third engagement section 182 are engageable with each other. The upper race 135 and the main shaft section 111 are configured such that a clearance C7 formed between the third engagement section 182 and the fourth engagement section 180 is equal to or less than the clearance C1.

The sealed compressor 100 according to Embodiment 5 configured as described above can achieve advantages achieved by the sealed compressor 100 according to Embodiment 1.

In the sealed compressor 100 according to Embodiment 5, since the third engagement section 182 is provided on the outer peripheral surface of the main shaft section 111 and the fourth engagement section 180 is provided on the inner peripheral surface of the upper race 135, sliding between the flange surface 145 of the shaft 110 and the upper race 135 can be suppressed, and the upper race 135 and the main shaft section 111 are able to rotate together (synchronously).

Therefore, it becomes possible to suppress sliding between the inner peripheral surface of the upper race 135 and the outer peripheral surface of the main shaft section 111, which would otherwise occur if the upper race 135 and the main shaft section 111 do not rotate together (synchronously). As a result, damage to the outer peripheral surface of the main shaft section 111 can be avoided. Since a sliding loss generated in the thrust ball bearing 132 can be suppressed, generation of a noise in the sealed compressor 100 can be suppressed, and a higher efficiency of the sealed compressor 100 can be achieved.

In the sealed compressor 100 according to Embodiment 5, since the upper race 135 and the main shaft section 111 are configured such that the clearance C7 is equal to or less than the clearance C1, it becomes possible to suppress the upper race 135 from being displaced radially with respect to the shaft 110, according to the vibration of the shaft 110.

As compared to the sealed compressor 100 according to Embodiment 1, a deviation between the center of rotation of the main shaft section 111 and the center of the pitch of the balls 134 can be suppressed more effectively. As a result, the smooth rotation of the balls 134 can be maintained, generation of a noise can be suppressed, and a higher efficiency of the sealed compressor 100 can be achieved.

Although in Embodiment 5, the limiting means includes the third engagement section 182 and the fourth engagement section 180, it may include a combination of the limiting means (first limiting means) of Embodiment 1 to Embodiment 4 (and Modified examples) and the third engagement section 182 and the fourth engagement section 180.

Although in Embodiment 5, the main bearing unit 120 is provided with the bearing extending section 144, it may not be provided with the bearing extending section 144. Although in Embodiment 5, the lower race 136 is disposed to contact the thrust surface 130, the wave washer 338 may be provided between the lower race 136 and the thrust surface 130.

Modified Example 1

Next, Modified example of the sealed compressor 100 according to Embodiment 5 will be described.

Figure 17:
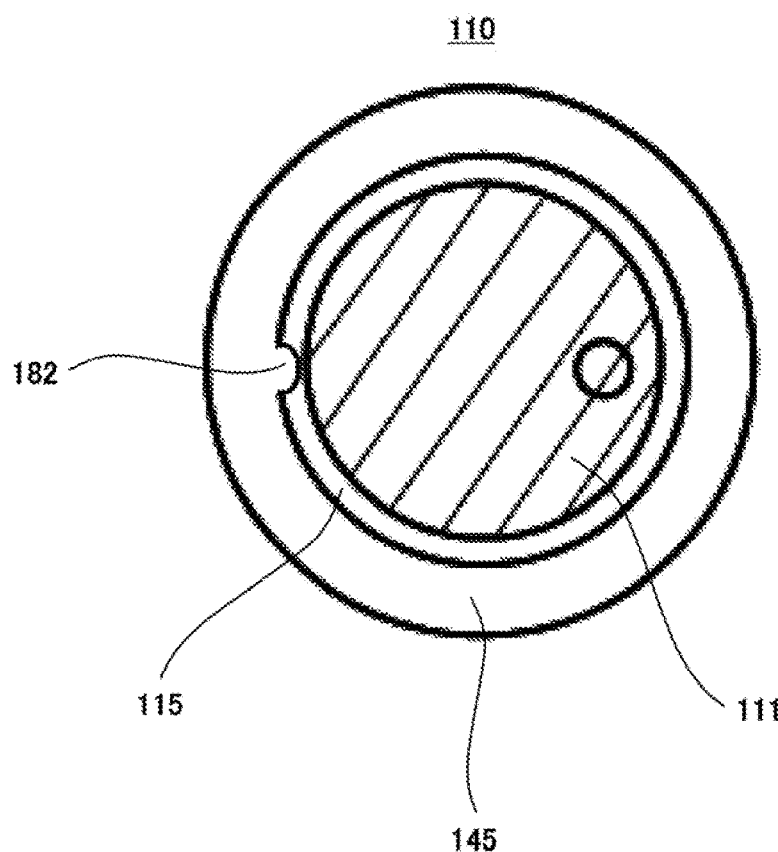
FIG. 17 is a view schematically showing a configuration of a shaft of a sealed compressor according to Modified example 1 of Embodiment 5.
Figure 18:
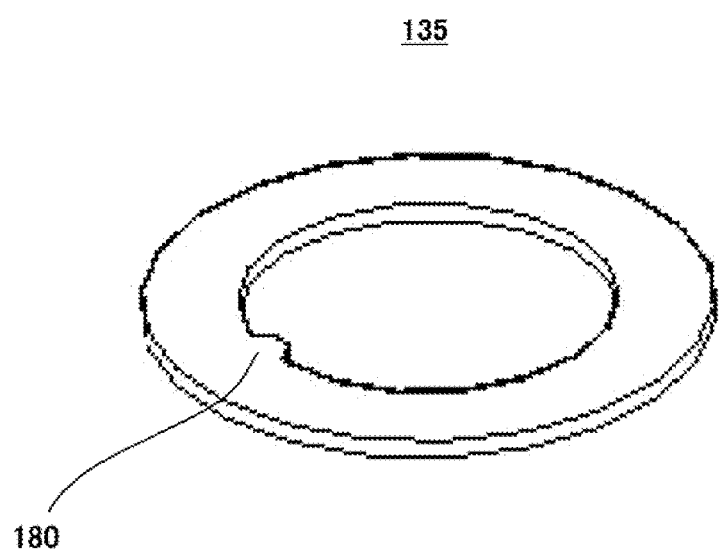
FIG. 18 is a view schematically showing a configuration of an upper race of the sealed compressor according to Modified example 1 of Embodiment 5.

FIG. 17 is a view schematically showing a configuration of a shaft of a sealed compressor according to Modified example 1 of Embodiment 5. FIG. 18 is a view schematically showing a configuration of an upper race of the sealed compressor according to Modified example 1 of Embodiment 5.

Referring to FIGS. 17 and 18, the sealed compressor 100 according to Modified example 1 has basically the same configuration as that of the sealed compressor 100 according to Embodiment 5, except for a shape of the third engagement section 182 and a shape of the fourth engagement section 180.

Specifically, the third engagement section 182 has a circular-arc shape when viewed from the axial direction of the main shaft section 111. This circular-arc shape has a center which is located outward relative to the outer diameter of the main shaft section 111. Likewise, the fourth engagement section 180 has a circular-arc shape when viewed from a thickness direction of the main surface of the upper race 135. This circular-arc shape has a center which is located outward relative to the outer diameter of the upper race 135.

The sealed compressor 100 according to Modified example 1 of Embodiment 5 configured as described above can achieve advantages achieved by the sealed compressor 100 according to Embodiment 5.

Embodiment 6

A sealed compressor according to Embodiment 6 comprises an electric component including a stator and a rotor, a compression component actuated by the electric component, and a sealed container which accommodates the electric component and the compression component, and stores lubricating oil therein, a second limiting means which limits a vertical displacement of an upper race with respect to a shaft, the compression component includes the shaft including a main shaft section to which the rotor is fastened and an eccentric shaft section, a cylinder block having a compression chamber, a piston reciprocatable inside the compression chamber, a connecting member for coupling the piston to the eccentric shaft section, a main bearing unit mounted to the cylinder block and supporting the main shaft section such that the main shaft section is rotatable, a thrust ball bearing mounted to a thrust surface of the main bearing unit, the thrust ball bearing includes a plurality of balls held in a cage, the upper race having main surfaces one of which is in contact with upper portions of the balls, a lower race having main surfaces one of which is in contact with lower portions of the balls, raceway grooves formed by the annular grooves are provided on the main surface of the upper race and the main surface of the lower race, respectively, the main surfaces facing each other, and the balls are placed on the raceway groove of the upper race and on the raceway groove of the lower race.

In the sealed compressor according to Embodiment 6, the second limiting means may comprise a pressing section which presses an upper portion of the thrust ball bearing from above.

In the present embodiment, differences from the configurations and technical ideas described in detail in the above embodiments will be described, and the same components as those described in detail in the above embodiments, or components other than the components which will not cause any problems even when the same technical ideas are applied, may be combined with the present embodiment, and will not be described in detail repeatedly.

In the sealed compressor according to Embodiment 6, the compression component is positioned above the electric component, the shaft has a connecting section for connecting the main shaft section to the eccentric shaft section, the connecting section may be provided with a flange surface which faces the other main surface of the upper race, and the pressing section may include an annular convex section provided on the flange surface.

In the sealed compressor of Embodiment 6, the convex section has a shape in which its inner diameter is greater than a length derived by subtracting a diameter of the balls from a pitch diameter of the balls, and its outer diameter is greater than the pitch diameter of the balls.

In the sealed compressor according to Embodiment 6, the convex section may be configured such that a track of an intermediate point between the outer diameter and the inner diameter is located outward relative to the pitch of the balls.

In the sealed compressor according to Embodiment 6, the convex section may have a tip end formed by a flat surface.

In the sealed compressor according to Embodiment 6, the convex section may have a shape in which a length between the outer diameter and the inner diameter is equal to or greater than 1/8 of the diameter of the balls. For easiness of processing of the convex section, the length between the outer diameter and the inner diameter is required to be equal to or greater than 1 mm.

Hereinafter, an exemplary sealed compressor according to Embodiment 6 will be described with reference to FIGS. 19 and 20.

Figure 19:
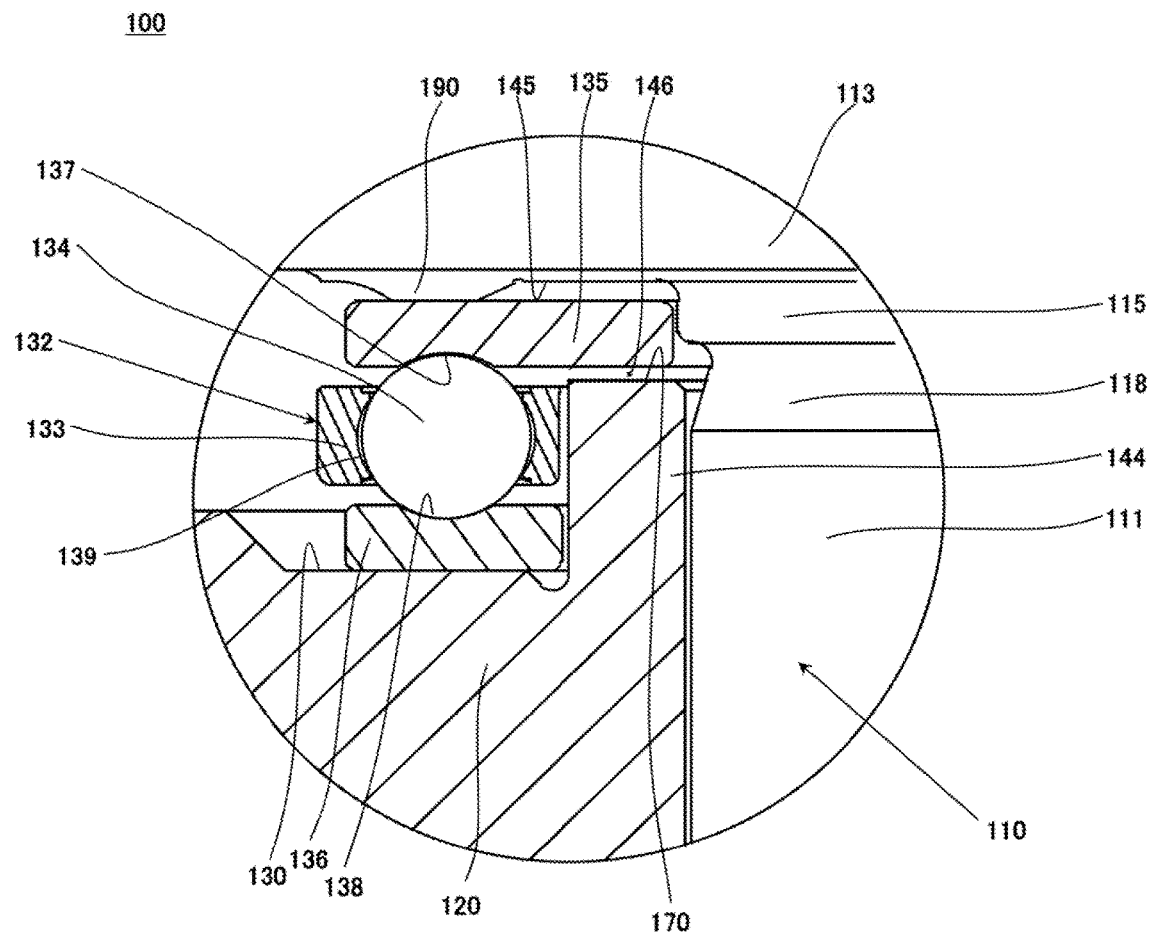
FIG. 19 is a view schematically showing major components of a sealed compressor according to Embodiment 6, in an enlarged manner.

FIG. 19 is a view schematically showing major components of the sealed compressor according to Embodiment 6, in an enlarged manner. FIG. 20 is a view schematically showing a configuration of a shaft of the sealed compressor of FIG. 19. In FIG. 19, upper and lower sides of the sealed compressor are depicted as upper and lower sides in FIG. 19.

Figure 20:
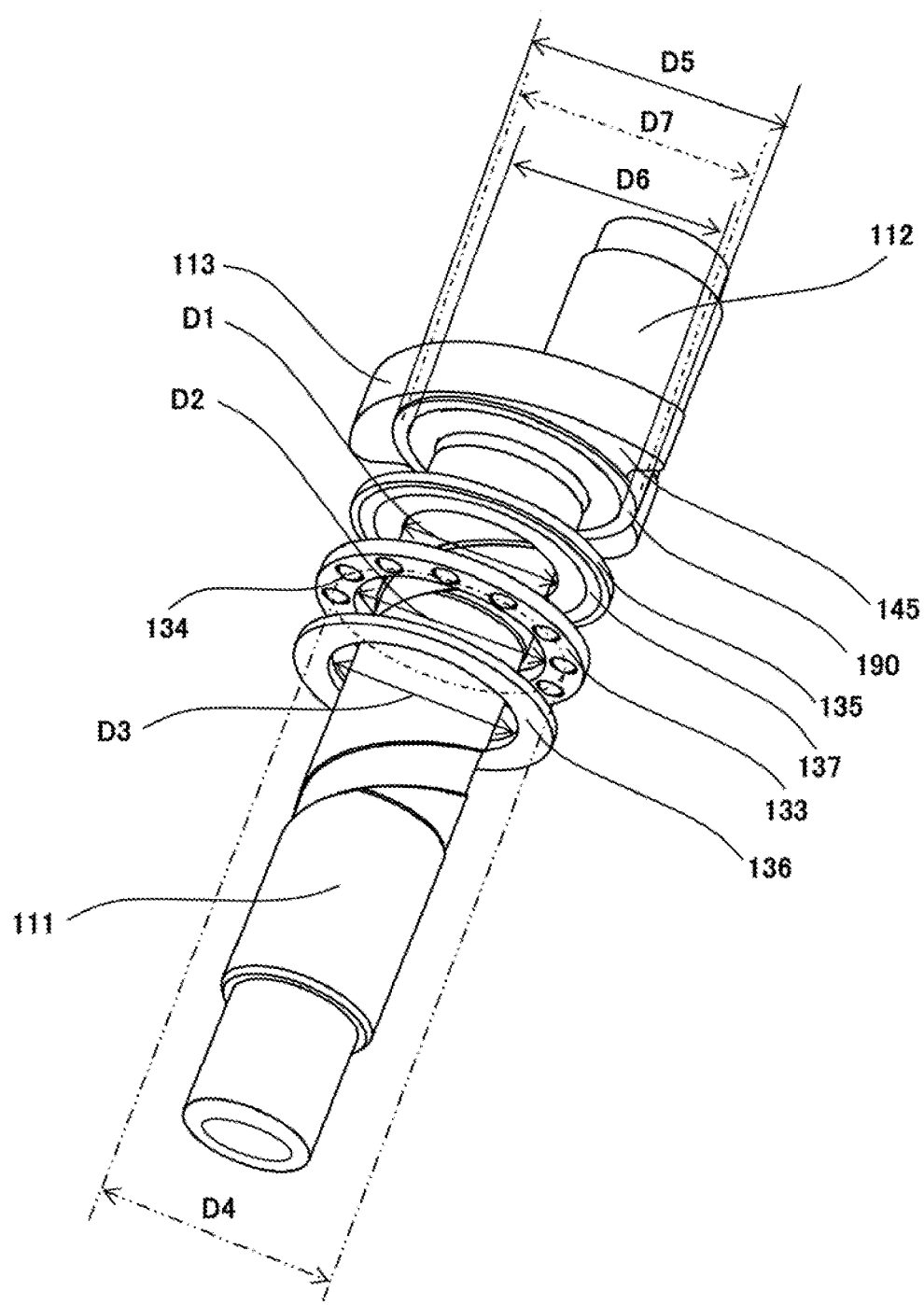
FIG. 20 is a view schematically showing a configuration of a shaft of the sealed compressor of FIG. 19.

Referring to FIGS. 19 and 20, the sealed compressor 100 according to Embodiment 6 has basically the same configuration as that of the sealed compressor 100 according to Embodiment 1, except that the limiting means comprises the pressing section (second limiting means) which limits a circumferential displacement of the upper race with respect to the shaft. More specifically, the pressing section (second limiting means) includes an annular convex section 190 provided on the flange surface 145 of the shaft 110.

The convex section 190 has a ring-shape concentric with a center axis of the main shaft section 111, and protrudes downward from the flange surface 145. The convex section 190 has a shape in which its inner diameter D6 is greater than a length derived by subtracting the diameter of the balls 134 from a pitch diameter D4 of the balls 134, and its outer diameter D5 is greater than the pitch diameter D4 of the balls 134.

The term "inner diameter of the convex section 190" refers to a dimension of a diameter of a circular contour portion located at an innermost side (center axis side of the main shaft section 111) of a portion of the convex section 190 which contacts the upper main surface of the upper race 135. The term "outer diameter of the convex section 190" refers to a dimension of a diameter of a circular contour portion located at an outermost side of the portion of the convex section 190 which contacts the upper main surface of the upper race 135.

In Embodiment 6, the inner diameter D6 of the convex section 190 is set to 25.4 mm, while the outer diameter D5 of the convex section 190 is set to 29 mm. The diameter of the balls 134 is set to 3.2 mm. The pitch diameter D4 of the balls 134 which is determined by the cage 133 and the balls 134 is set to 27 mm.

Now, a method of setting the inner diameter D6 and the outer diameter D5 of the convex section 190 will be described with reference to FIG. 21.

Figure 21:
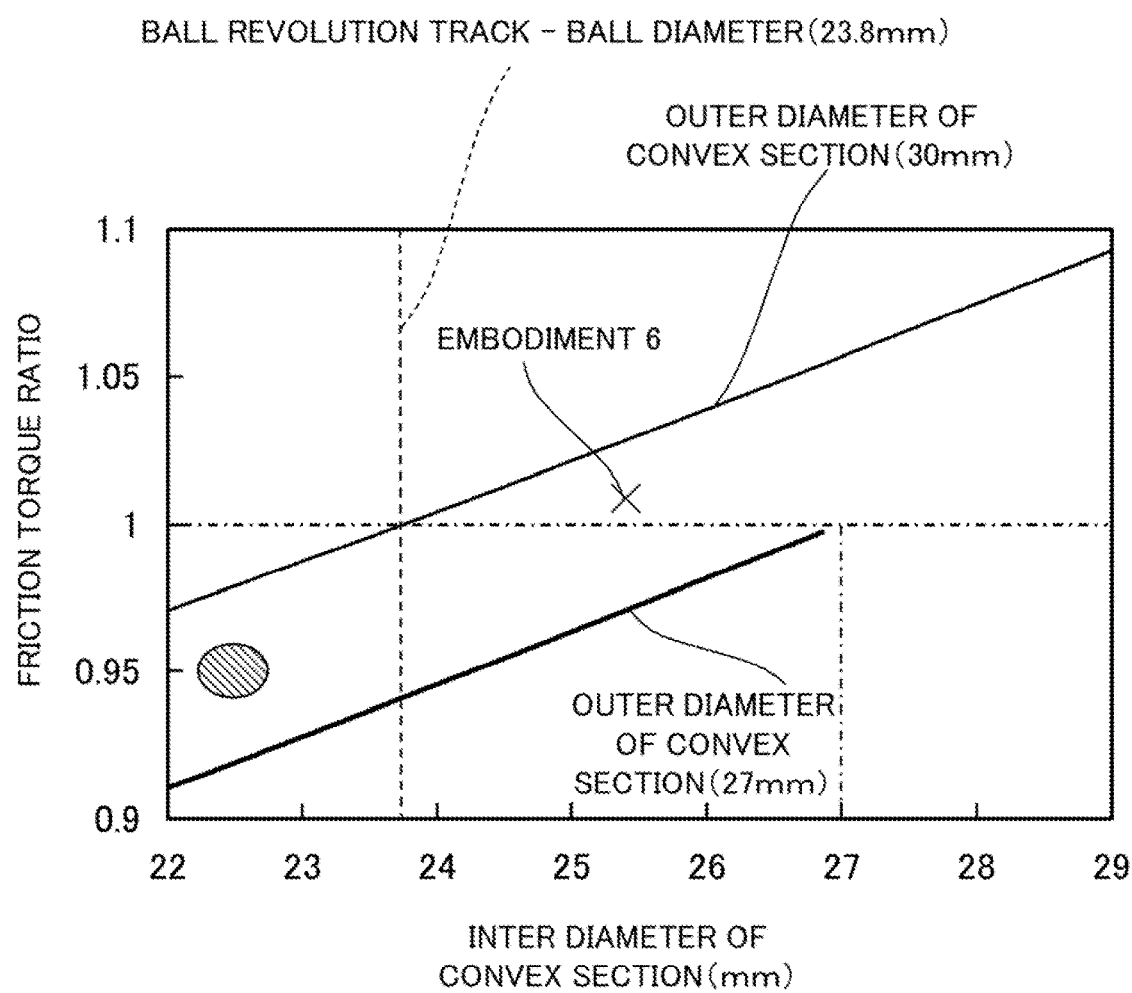
FIG. 21 is a graph showing a ratio of friction torque between a convex section and the upper race with respect to friction torque between balls and the upper race.

FIG. 21 is a graph showing a relationship between the inner diameter of the convex section and a friction torque ratio in a case where the outer diameter of the convex section is set to a particular value. The term "friction torque ratio" is defined as a ratio of friction torque between the convex section and the upper race with respect to friction torque between the balls and the upper race (to be precise, the raceway groove of the upper race). The friction torque ratio increases as the latter is greater relative to the former. The term "friction torque" is defined as torque attributed to a frictional force exerted on the upper race 135, and can be calculated according to a predetermined calculation formula.

FIG. 21 depicts two graphs and one region. The two graphs are a graph derived by changing the inner diameter D6 of the convex section 190 in a state in which the outer diameter D5 of the convex section 190 is set to 27 mm, and a graph derived by changing the inner diameter D6 of the convex section 190 in a state in which the outer diameter D5 of the convex section 190 is set to 30 mm. The region which is expressed as hatched in FIG. 21 represents a friction torque ratio in a case where the convex section 190 is not provided on the flange surface 145, the flange surface 145 has a substantially conical shape, a portion at a center axis side (center axis side of the main shaft section 111) protrudes farther than a portion at an outer peripheral side (flange surface 145 contacts the upper main surface of the upper race 135 in a portion in a range of a diameter 22 to 23 mm around the center axis of the main shaft section 111).

As can be seen from FIG. 21, the friction torque generated between the convex section 190 and the upper main surface of the upper race 135 becomes greater than the friction torque generated between the upper race 135 and the balls 134, as the inner diameter D6 of the convex section 190 increases. As can be seen from a comparison between the graph corresponding to the case where the outer diameter D5 of the convex section 190 is 27 mm and the graph corresponding to the case where the outer diameter D5 of the convex section 190 is 30 mm, the friction torque generated between the convex section 190 and the upper main surface of the upper race 135 becomes greater than the friction torque generated between the upper race 135 and the balls 134, when the outer diameter D5 of the convex section 190 is greater than the pitch diameter D4 of the balls 134.

To this end, in Embodiment 6, the outer diameter D5 of the convex section 190 is set to 29 mm which is greater than the pitch diameter D4 (27 mm) of the balls 134, while the inner diameter D6 of the convex section 190 is set to 25.4 mm which is greater than the value (23.8 mm) derived by subtracting the diameter of the balls 134 from the pitch diameter D4 of the balls 134 (portion indicated by X in FIG. 21).

The tip end surface of the convex section 190 may be formed by the flat surface which is perpendicular to the center axis of the shaft 110 so that the tip end surface of the convex section 190 entirely presses the upper main surface of the upper race 135. In a case where the convex section 190 is formed by a grinder, the length between the outer diameter D5 and the inner diameter D6 of the convex section 190 may be equal to or greater than ⅛ of the diameter of the balls 134, in view of an error of processing accuracy of the grinder, etc.

If the length of the outer diameter D5 and the length of the inner diameter D6 of the convex section 190 are increased, the friction torque increases. Therefore, the convex section 190 may be configured such that a track D7 of the intermediate point between the outer diameter D5 and the inner diameter D6 is greater than the pitch diameter D4 of the balls 134, or the inner diameter D6 is greater than the pitch diameter D4 of the balls 134.

As described above, in the sealed compressor 100 according to Embodiment 6, the convex section 190 is provided on the flange surface 145 of the shaft 110 so as to have a shape in which the inner diameter D6 is greater than the length derived by subtracting the diameter of the balls 134 from the pitch diameter D4 of the balls 134, and the outer diameter D5 is greater than the pitch diameter D4 of the balls 134. In this structure, the friction torque generated between the convex section 190 of the flange surface 145 and the upper main surface of the upper race 135 can be made greater than the friction torque generated between the raceway groove 137 of the upper race 135 and the balls 134. Therefore, sliding (circumferential displacement of the upper race 135) between the flange surface 145 (to be precise, convex section 190) of the shaft 110 and the upper race 135 can be suppressed, and the upper race 135 and the shaft 110 are able to rotate together.

Since the friction torque generated between the convex section 190 of the flange surface 190 and the upper main surface of the upper race 135 can be made greater, a thrust load applied to the upper race 135 can be made even, sliding of the upper race 135 with respect to the shaft 110 can be prevented, and thus a circumferential displacement and a radial displacement of the upper race 135 with respect to the shaft 110 can be suppressed.

In the conventional example, when the friction generated in the portion of the balls 134 and the portion of the raceway groove of the upper race 135, which portions are in contact with each other, and the portion of the balls 134 and the raceway groove of the lower race 136, which portions are in contact with each other, increase, the shaft 110 and the race 135 become unable to rotate together, and sliding between the shaft 110 and the upper race 135 occurs. For this reason, a sliding property of the thrust ball bearing 132 is degraded, a sliding loss increases, and the efficiency of the compressor is reduced. However, in the configuration of the present embodiment, since the thrust load is applied more evenly to the upper race 135, sliding between the shaft 110 and the upper race 135 can be suppressed.

In the case where the plurality of pressing sections are provided as described above, for example, the main pressing section may be placed on a projecting surface in a vertical direction of the center of the balls 134, and an auxiliary pressing section may be formed in another region. In this case, the main pressing section can achieve the above described advantages of the present embodiment, and the auxiliary pressing section allows the upper race and the flange of the shaft to rotate together more stably.

In the sealed compressor 100 according to Embodiment 6, since the convex section 190 is configured such that the track D7 of the intermediate point between the outer diameter D5 and the inner diameter D6 is greater than the pitch diameter D4 of the balls 134, a pressing force is applied from a portion of the balls 134 which is located outward relative to the center, to the upper race 135. This allows the friction torque generated between the convex section 190 of the flange surface 145 and the upper main surface of the upper race 135 to be made greater, and sliding between the flange surface 145 (to be precise, convex section 190) of the shaft 110 and the upper race 135 can be suppressed more effectively.

In the sealed compressor 100 according to Embodiment 6, since the convex section 190 is provided on the flange surface 145, the entire of the flange surface 145 need not be made flat. This eliminates a need for high accuracy in processing for forming the flat surface. As a result, a productivity of the sealed compressor 100 can be improved.

Even in a case where a plurality of convex sections are provided as the pressing section on the flange surface, friction torque applied between the pressing section and the upper race as a pressure-receiving section can be set higher than friction torque generated between the upper race and the balls. Therefore, the same advantages can be achieved.

Although in Embodiment 6, the limiting means comprises the convex section 190, it may include a combination of the first limiting means of Embodiment 1 to Embodiment 5 (and Modified examples) and the convex section 190.

Although in Embodiment 6, the main bearing unit 120 is provided with the bearing extending section 144, it may not be provided with the bearing extending section 144. Although in Embodiment 6, the lower race 136 is disposed to contact the thrust surface 130, the wave washer 338 may be provided between the lower race 136 and the thrust surface 130.

Although in Embodiment 6, the convex section 190 protrudes downward to be lower than the flange surface 145, the present invention is not limited to this. For example, the convex section 190 may be configured such that a recess is provided at a center axis side of the flange surface 145 (center axis side of the main shaft section 111, inner side), and the flange surface 145 protrudes downward to be lower than the bottom surface of the recess. That is, the flange surface 145 may constitute the convex section 190 (pressing section).

Modified Example 1

Next, Modified example of the sealed compressor 100 according to Embodiment 6 will be described.

In the sealed compressor according to Modified example 1 of Embodiment 6, the compression component is positioned below the electric component, the rotor is provided with a flange surface facing the other main surface of the upper race, the pressing section as the second limiting means includes an annular convex section provided on the flange surface, and the convex section has a shape in which its inner diameter is greater than a length derived by subtracting the diameter of the balls from the pitch diameter of the balls, and its outer diameter is greater than the pitch diameter of the balls.

Hereinafter, an exemplary sealed compressor according to Modified example 1 of Embodiment 6 will be described with reference to FIGS. 22 and 23.

Figure 22:
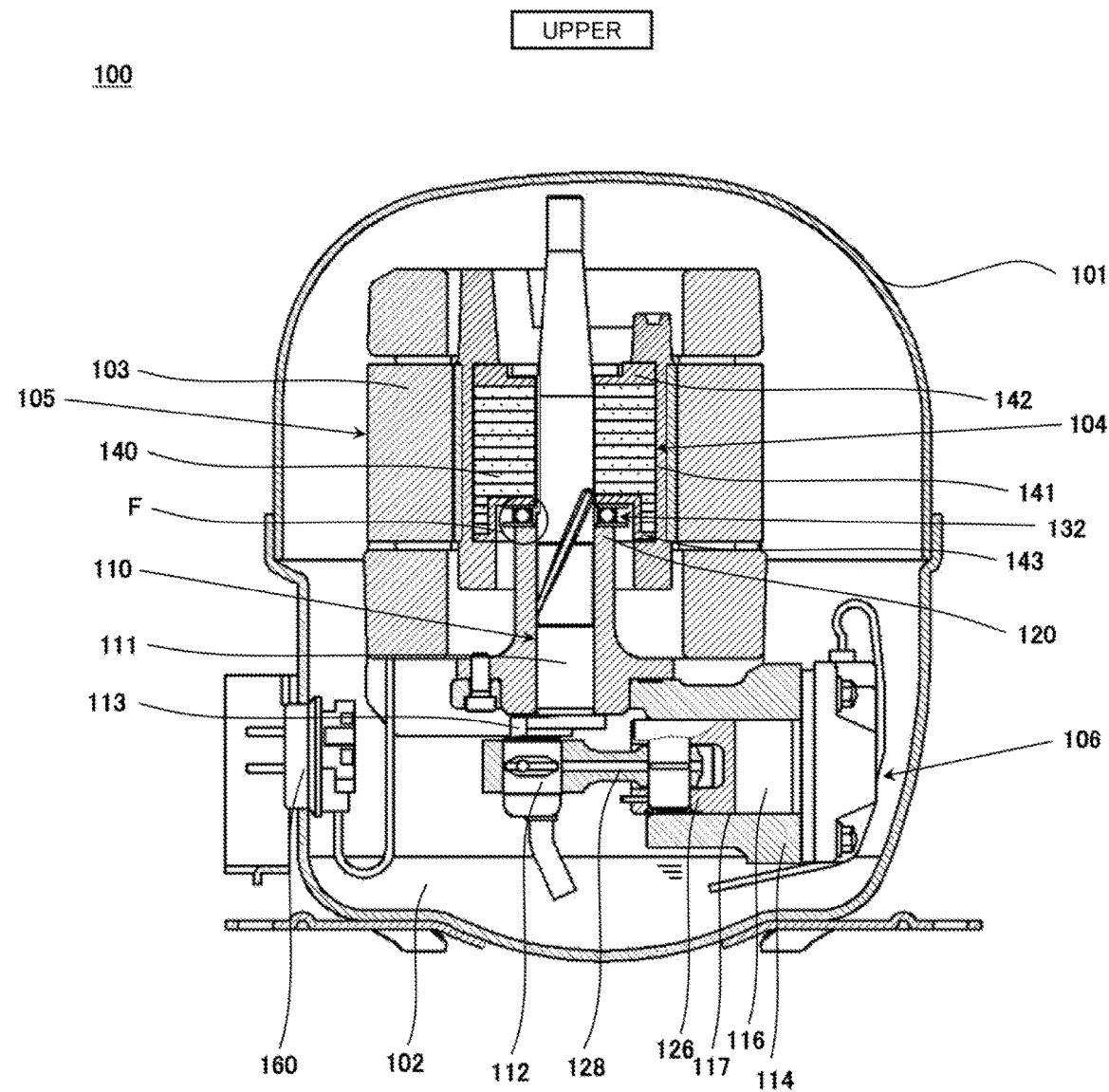
FIG. 22 is a longitudinal sectional view of a sealed compressor according to Modified example 1 of Embodiment 6.

FIG. 22 is a longitudinal sectional view of a sealed compressor according to Modified example 1 of Embodiment 6. FIG. 23 is a view schematically showing a region F of FIG. 22, in an enlarged manner. In FIG. 22, a portion of the constituents constituting the sealed compressor is omitted. In FIGS. 22 and 23, upper and lower sides of the sealed compressor are depicted as upper and lower sides in FIGS. 22 and 23.

Figure 23:
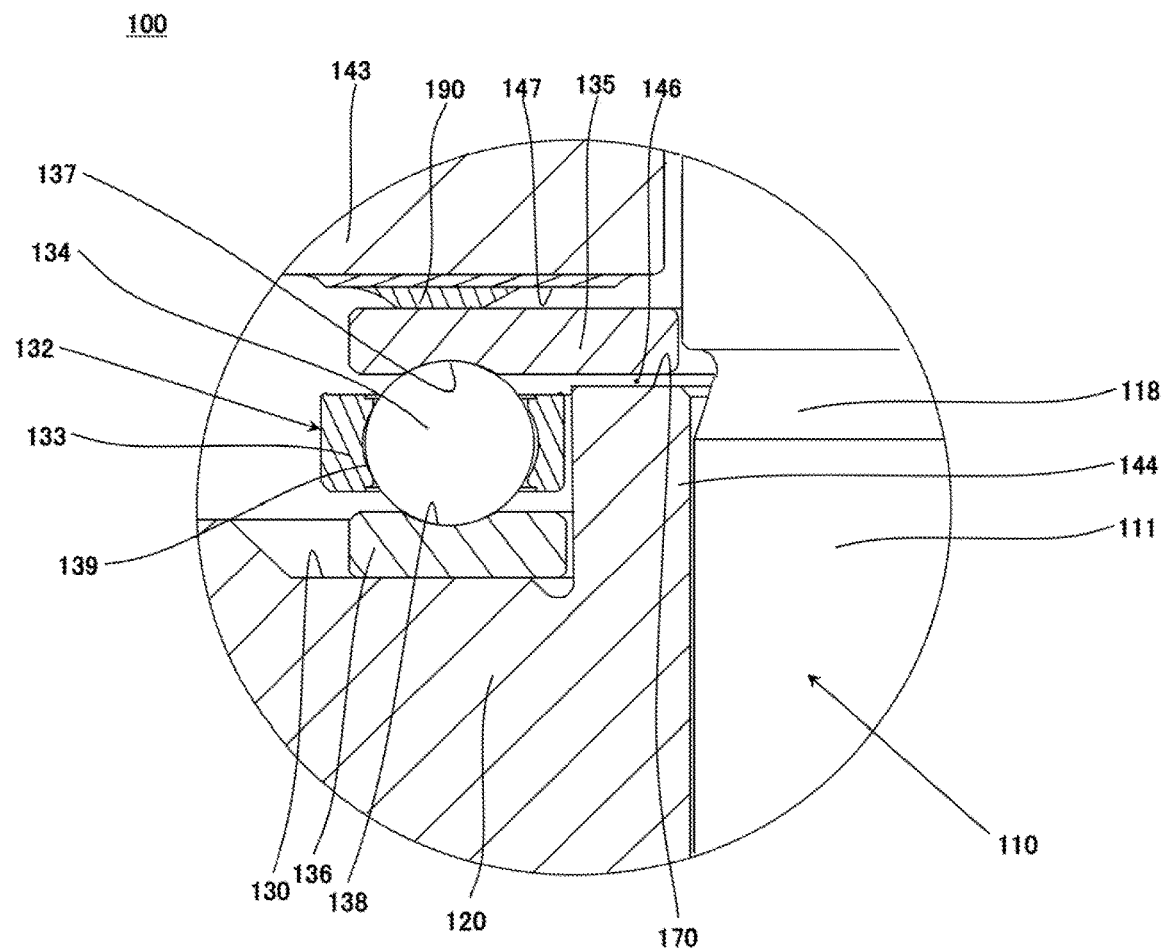
FIG. 23 is a view schematically showing a region F of FIG. 22, in an enlarged manner.
Figure 24:
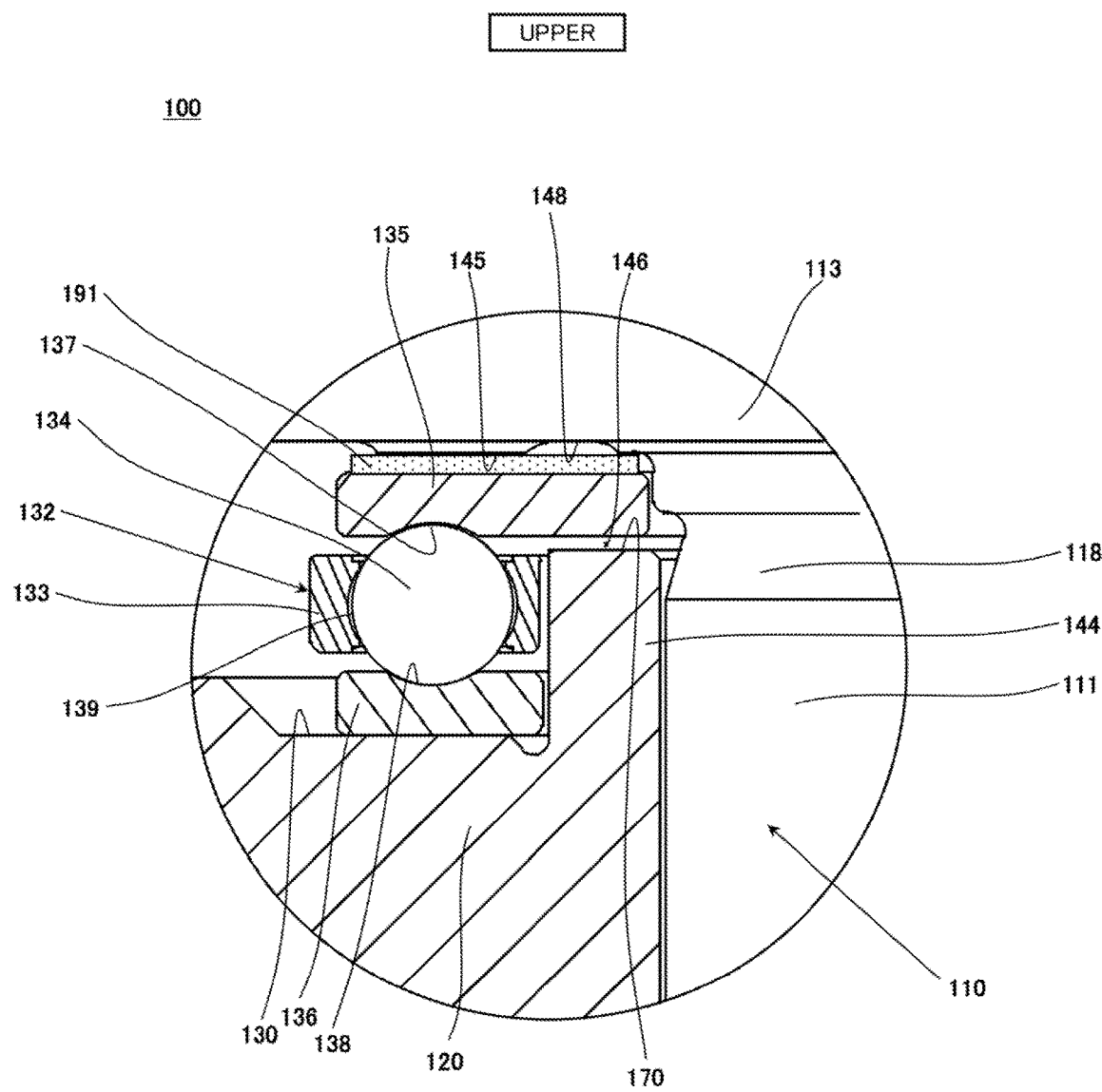
FIG. 24 is a view schematically showing major components of a sealed compressor according to Embodiment 7, in an enlarged manner.

Referring to FIGS. 23 and 24, the sealed compressor 100 according to Modified example 1 of Embodiment 6 has basically the same configuration as that of the sealed compressor 100 according to Embodiment 6, except that the compression component 106 is positioned below the electric component 105, the second member 143 constituting the rotor 104 is provided with a flange surface 147, and the convex section 190 is provided on the flange surface 147.

The sealed compressor 100 according to Modified example 1 configured as described above can achieve advantages achieved by the sealed compressor 100 according to Embodiment 6.

Although in Modified example 1, the main bearing unit 120 is provided with the bearing extending section 144, it may not be provided with the bearing extending section 144. Although in Modified example 1 of Embodiment 6, the lower race 136 is disposed to contact the thrust surface 130, the wave washer 338 may be provided between the lower race 136 and the thrust surface 130.

Although in Modified example 1, the convex section 190 protrudes downward to be lower than the flange surface 147, the present invention is not limited to this. For example, the convex section 190 may be configured such that a recess is provided at a center axis side of the flange surface 147 (center axis side of the main shaft section 111, inner side), and the flange surface 147 protrudes downward to be lower than the bottom surface of the recess. That is, the flange surface 147 may constitute the convex section 190 (pressing section).

Embodiment 7

In a sealed compressor according to Embodiment 7, the pressing section comprises a pressing member disposed between the other main surface of the upper race and the flange surface.

In the present embodiment, differences from the configurations and technical ideas described in detail in the above embodiments will be described, and the same components as those described in detail in the above embodiments, or components which will not cause any problems even when the same technical ideas are applied, may be combined with the present embodiment, and will not be described in detail repeatedly.

In the sealed compressor according to Embodiment 7, the pressing member may have a shape in which its height is smaller than a height of the upper race.

In the sealed compressor of Embodiment 7, the compression component is positioned above the electric component, the shaft has a connecting section for connecting the main shaft section to the eccentric shaft section, and the connecting section has a flange surface facing the other main surface of the upper race.

Hereinafter, an exemplary sealed compressor according to Embodiment 7 will be described with reference to FIG. 24.

Figure 25:
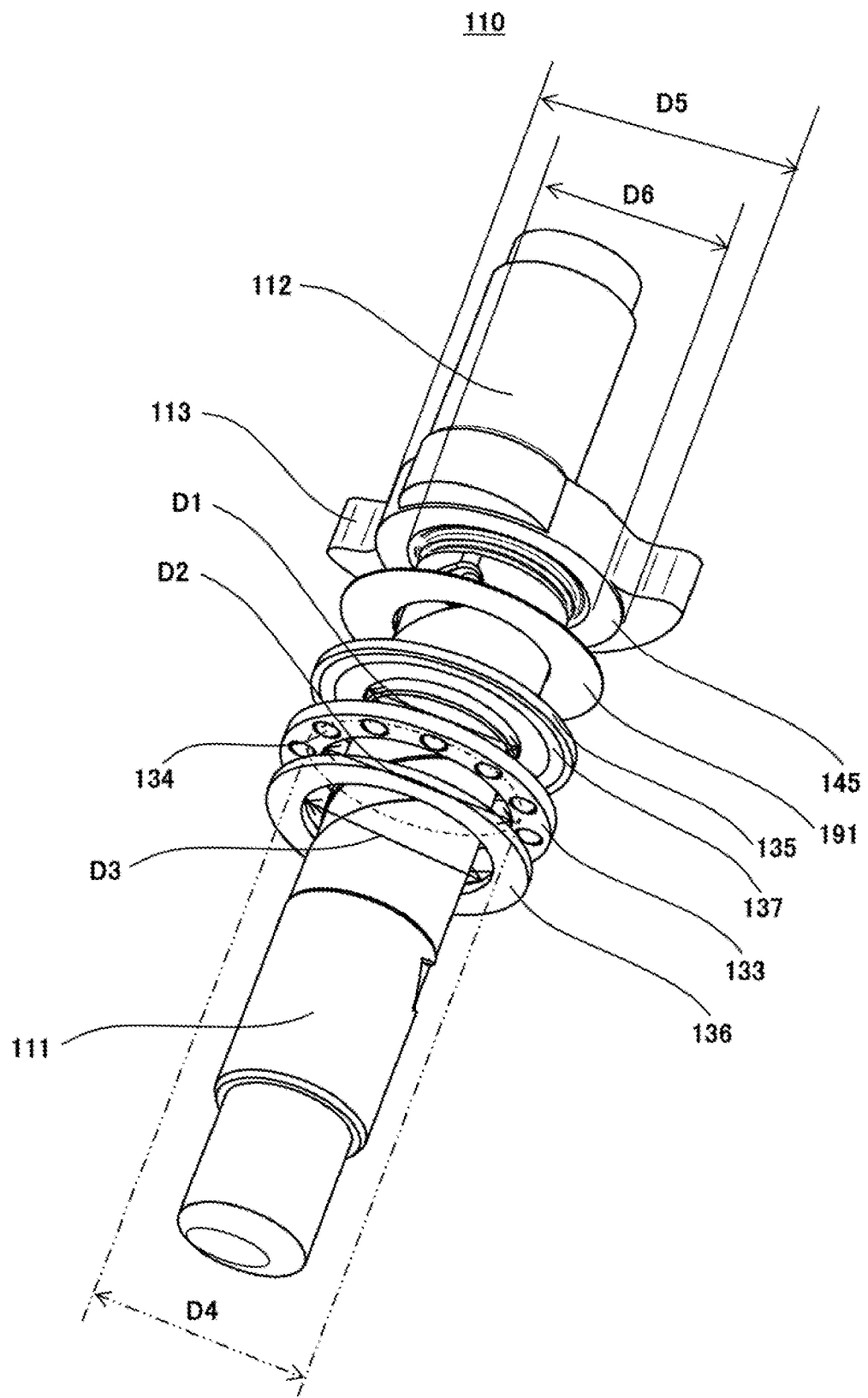
FIG. 25 is a view schematically showing a configuration of a shaft and an adjustment member of the sealed compressor of FIG. 24.

FIG. 24 is a view schematically showing major components of a sealed compressor according to Embodiment 7, in an enlarged manner. FIG. 25 is a view schematically showing a configuration of a shaft and a pressing member of the sealed compressor of FIG. 24. In FIG. 24, upper and lower sides of the sealed compressor are depicted as upper and lower sides in FIG. 24.

Referring to FIGS. 24 and 25, the sealed compressor 100 according to Embodiment 7 has basically the same configuration as that of the sealed compressor 100 according to Embodiment 6, except that the pressing section as the second limiting means includes an adjustment member (pressing member; elastic member) 191 disposed between the flange surface 145 of the shaft 110 and the upper race 135.

The recess 148 is formed on a portion of the flange surface 145 on the center axis side (center axis side of the main shaft section 111: inner side), and has a ring shape when viewed from below. The recess 148 is recessed upward relative to the flange surface 145. In other words, the flange surface 145 protrudes downward to be lower than the bottom surface of the recess 148. Thus, the flange surface 145 serves as the convex section 190 (pressing section).

The adjustment member 191 has a ring-shape (disc shape having an opening in a center portion thereof), and is formed of a thin plate made of metal (e.g., carbon steel or valve steel). The adjustment member 191 is disposed between the flange surface 145 of the shaft 110 and the upper race 135 such that a center of its outer diameter and a center of its inner diameter substantially conform to the center axis of the main shaft section 111.

An outer diameter of the adjustment member 191 is set greater than an outer diameter of the flange surface 145. This can increase an area of a portion of the upper main surface of the adjustment member 191 and a portion of the flange surface 145 which portions are in contact with other, and an area of a portion of the lower main surface of the adjustment member 191 and a portion of the upper main surface of the upper race 135 which portions are in contact with other.

A thickness of the adjustment member 191 is set smaller than a thickness of the upper race 135. Specifically, in Embodiment 7, the thickness of the adjustment member 191 is 0.2 mm, while the thickness of the upper race 135 is 1.3 mm.

Thereby, the stiffness of the adjustment member 191 can be made lower than the stiffness of the upper race 135. Therefore, in a case where the flange surface 145 of the shaft 110 is not good in flatness but has unevenness, the adjustment member 191 can be elastically deformed so as to conform to the unevenness of the flange surface 145, as compared to the upper race 135. This makes it possible to make an area of a portion of the flange surface 145 and a portion of the adjustment member 191 which portions are in contact with other (or, an area of a portion of the upper race 135 and a portion of the adjustment member 191 which portions are in contact with other), greater than an area of a portion of the flange surface 145 and a portion of the upper main surface of the upper race 135 which portions are in contact with other in the case where the adjustment member 191 is not provided. Therefore, sliding of the upper race 135 can be suppressed.

When the shaft 110 vibrates, the center axis of the main shaft section 111 is inclined and the flange surface 145 is inclined. Since the adjustment member 191 is elastically deformed, the vibration of the shaft 110 can be suppressed. Because of this, the radial displacement of the upper race 135, due to the vibration of the shaft 110, can be suppressed.

As described above, in the present embodiment, the pressing section for suppressing a vertical displacement of the upper race 135 can be implemented by adding the adjustment member 191 as the pressing member without changing the upper race 135 and the flange surface 145 of the shaft 110. Therefore, with a simple configuration, it becomes possible to realize smooth sliding of the thrust ball bearing 132 having the raceway grooves. Therefore, the efficiency of the compressor can be improved.

The sealed compressor 100 according to Embodiment 7 configured as described above can achieve advantages achieved by the sealed compressor 100 according to Embodiment 6.

Although in Embodiment 7, the limiting means comprises the adjustment member 191, it may include a combination of the limiting means of Embodiment 1 to Embodiment 6 (and Modified examples) and the adjustment member 191 as the pressing member.

Although in Embodiment 7, the main bearing unit 120 is provided with the bearing extending section 144, it may not be provided with the bearing extending section 144. Although in Embodiment 7, the lower race 136 is disposed to contact the thrust surface 130, the wave washer 338 may be provided between the lower race 136 and the thrust surface 130.

Modified Example 1

Next, Modified example 1 of the sealed compressor 100 according to Embodiment 7 will be described.

In a sealed compressor according to Modified example 1 of Embodiment 7, the compression component is positioned below the electric component, and the rotor is provided with a flange surface facing the other main surface of the upper race, the pressing section as the second limiting means comprises a pressing member disposed between the other main surface of the upper race and the flange surface.

Figure 26:
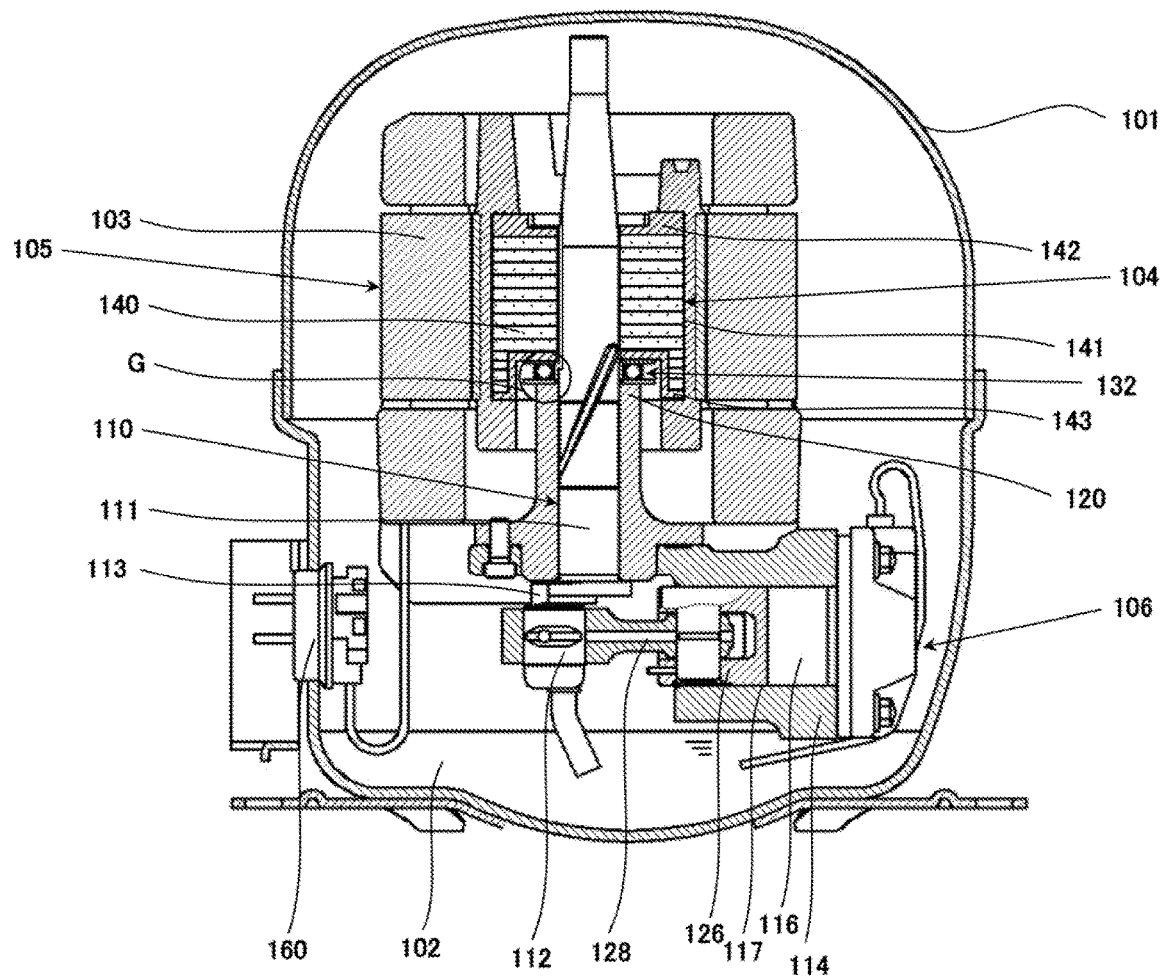
FIG. 26 is a longitudinal sectional view of a sealed compressor according to Modified example 1 of Embodiment 7.
Figure 27:
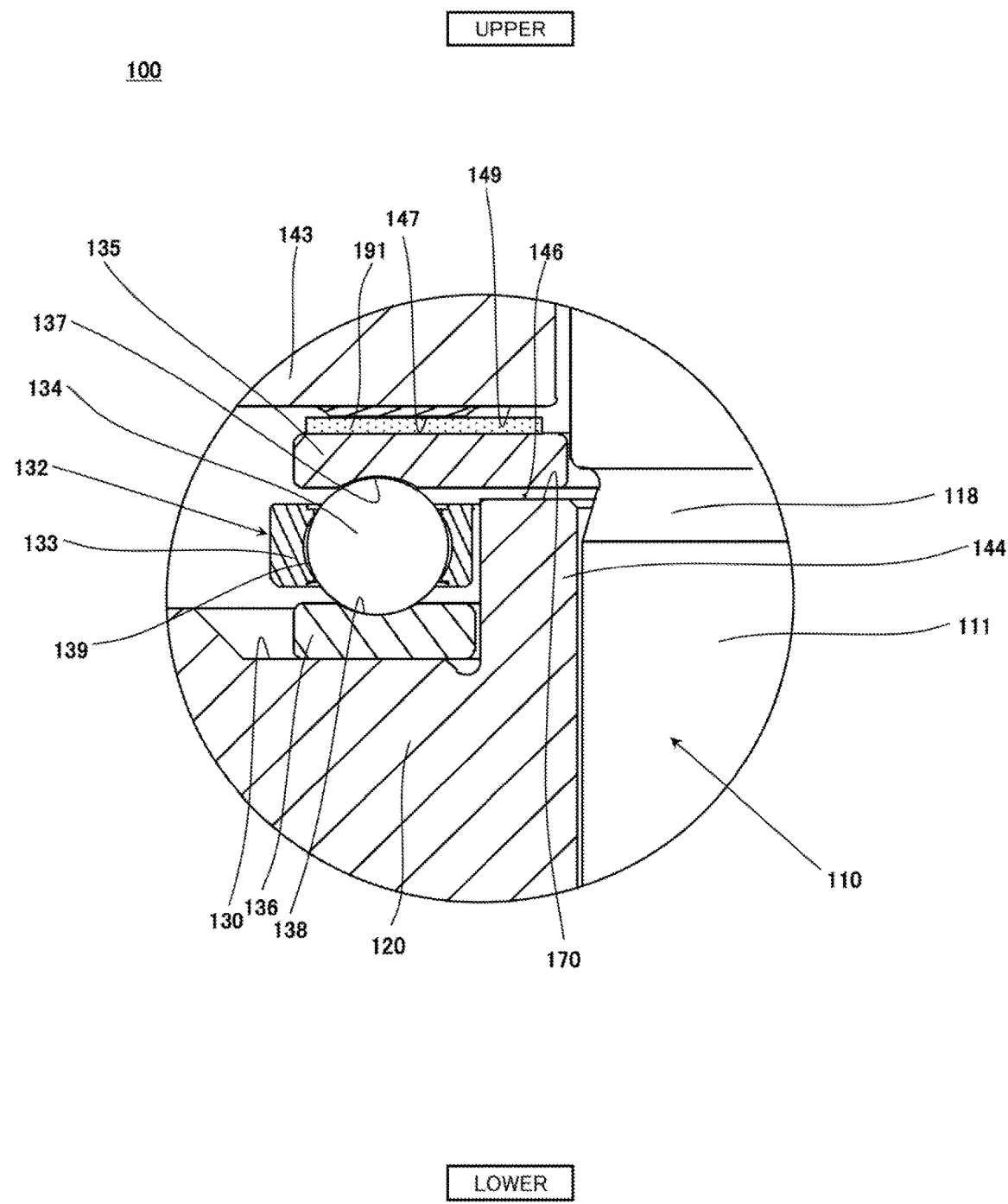
FIG. 27 is view schematically showing a region G of FIG. 26, in an enlarged manner.

FIG. 26 is a longitudinal sectional view of a sealed compressor according to Modified example 1 of Embodiment 7. FIG. 27 is view schematically showing a region G of FIG. 26, in an enlarged manner. In FIG. 26, a portion of the constituents constituting the sealed compressor is omitted. In FIGS. 26 and 27, upper and lower sides of the sealed compressor are depicted as upper and lower sides in FIGS. 26 and 27.

Referring to FIGS. 26 and 27, the sealed compressor 100 according to Modified example 1 of Embodiment 7 has basically the same configuration as that of the sealed compressor 100 according to Embodiment 7, except that the compression component 106 is positioned below the electric component 105, the second member 143 constituting the rotor 104 is provided with the flange surface 147, and the adjustment member 191 is provided between the flange surface 147 and the upper race 135.

The recess 149 is formed on an inner portion of the flange surface 147, and has a ring shape when viewed from below. The recess 149 is recessed upward relative to the flange surface 147. In other words, the flange surface 147 protrudes downward to be lower than the bottom surface of the recess 149. The inner diameter of the convex section 190 (pressing section) is defined by the outer diameter of the recess 149. Thus, the flange surface 147 serves as the convex section 190 (pressing section).

The sealed compressor 100 according to Modified example 1 configured as described above can achieve advantages achieved by the sealed compressor 100 according to Embodiment 7.

Although in Modified example 1, the main bearing unit 120 is provided with the bearing extending section 144, it may not be provided with the bearing extending section 144. Although in Modified example 1 the lower race 136 is disposed to contact the thrust surface 130, the wave washer 338 may be provided between the lower race 136 and the thrust surface 130.

Embodiment 8

A refrigeration unit according to Embodiment 8 includes the sealed compressor according to any one of Embodiment 1 to Embodiment 7 (and Modified examples).

[Configuration of Refrigeration Unit]

Figure 28:
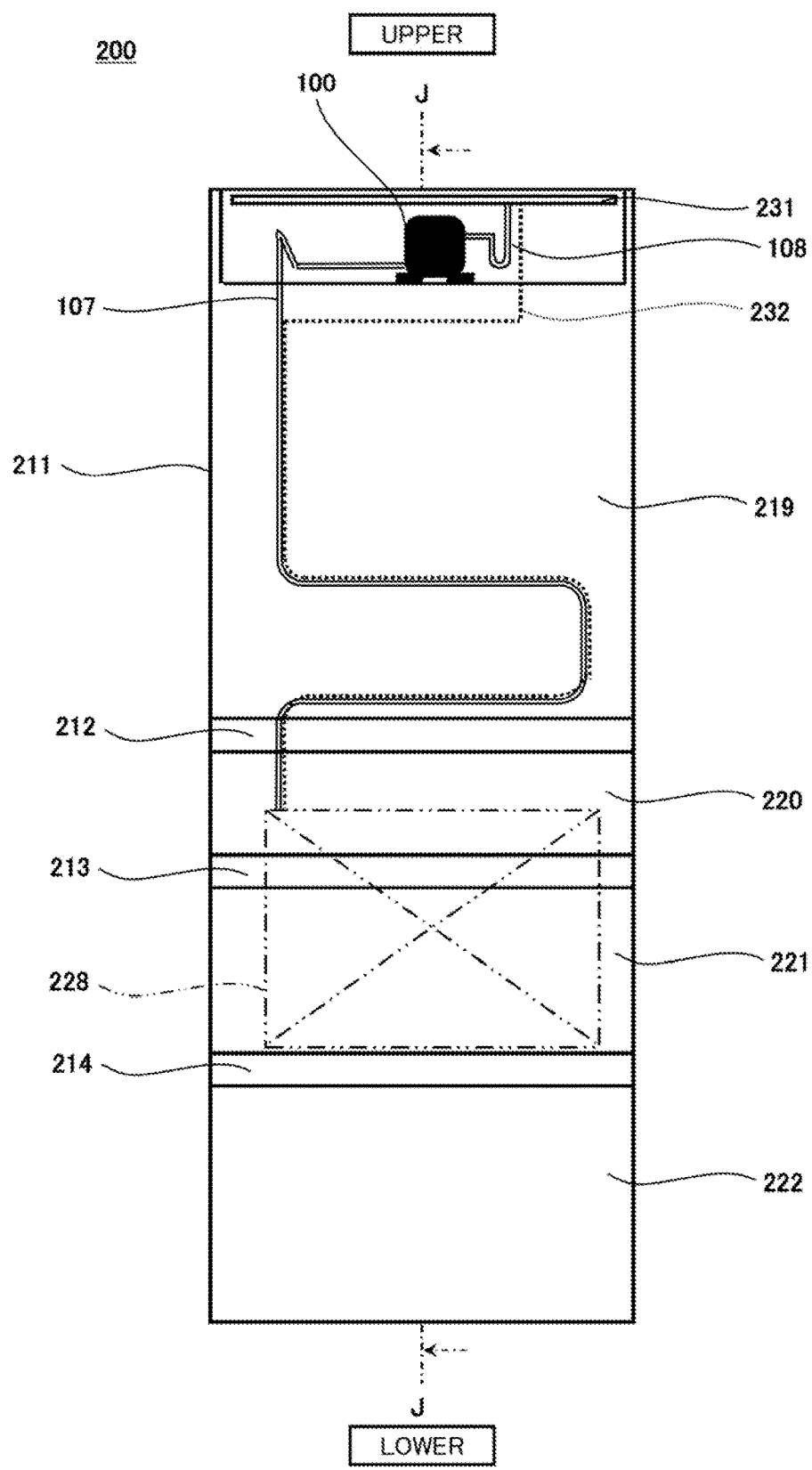
FIG. 28 is a view schematically showing a refrigeration unit according to Embodiment 8.
Figure 29:
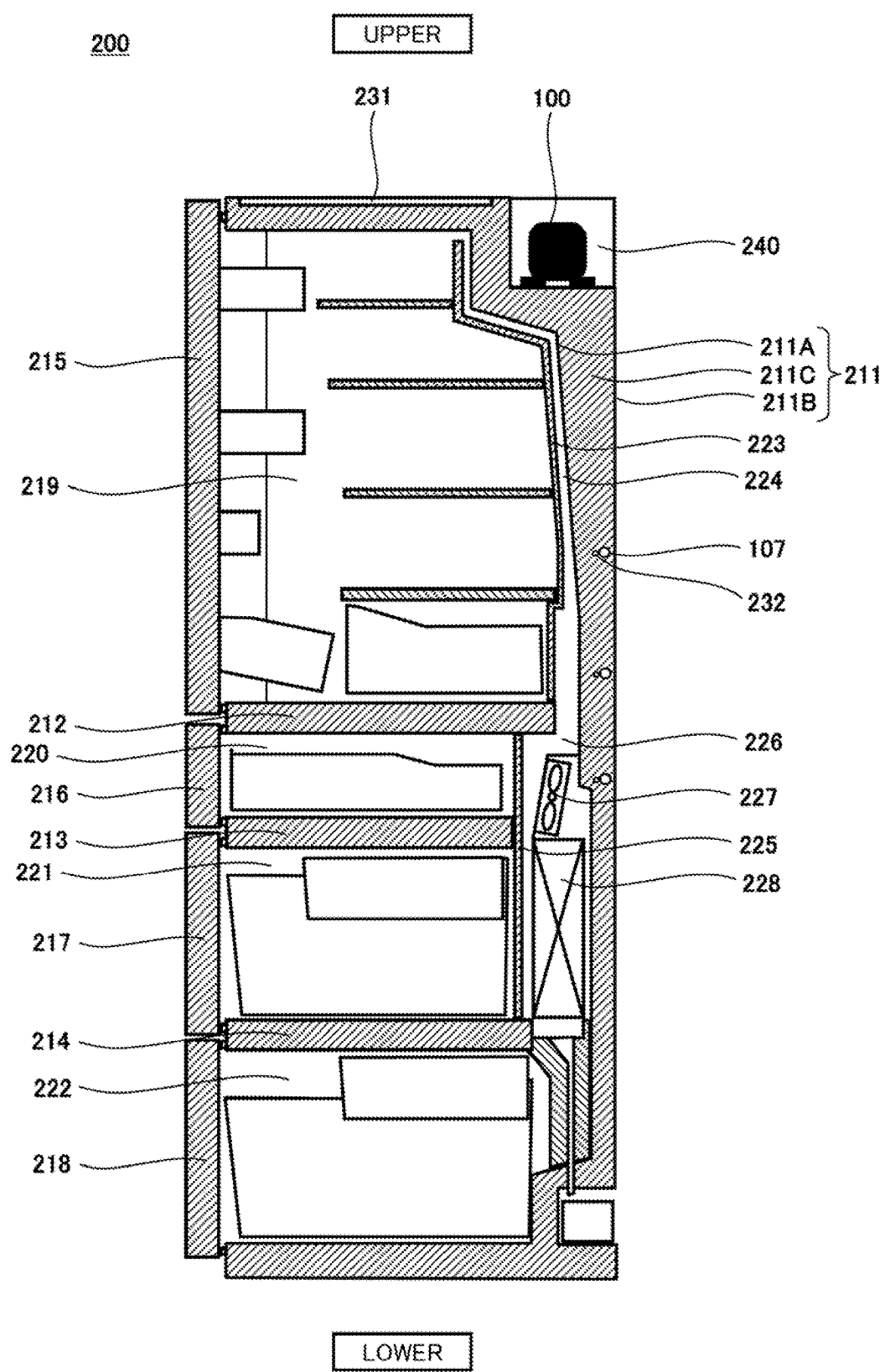
FIG. 29 is a cross-sectional view taken along J-J of FIG. 28.
Figure 30:
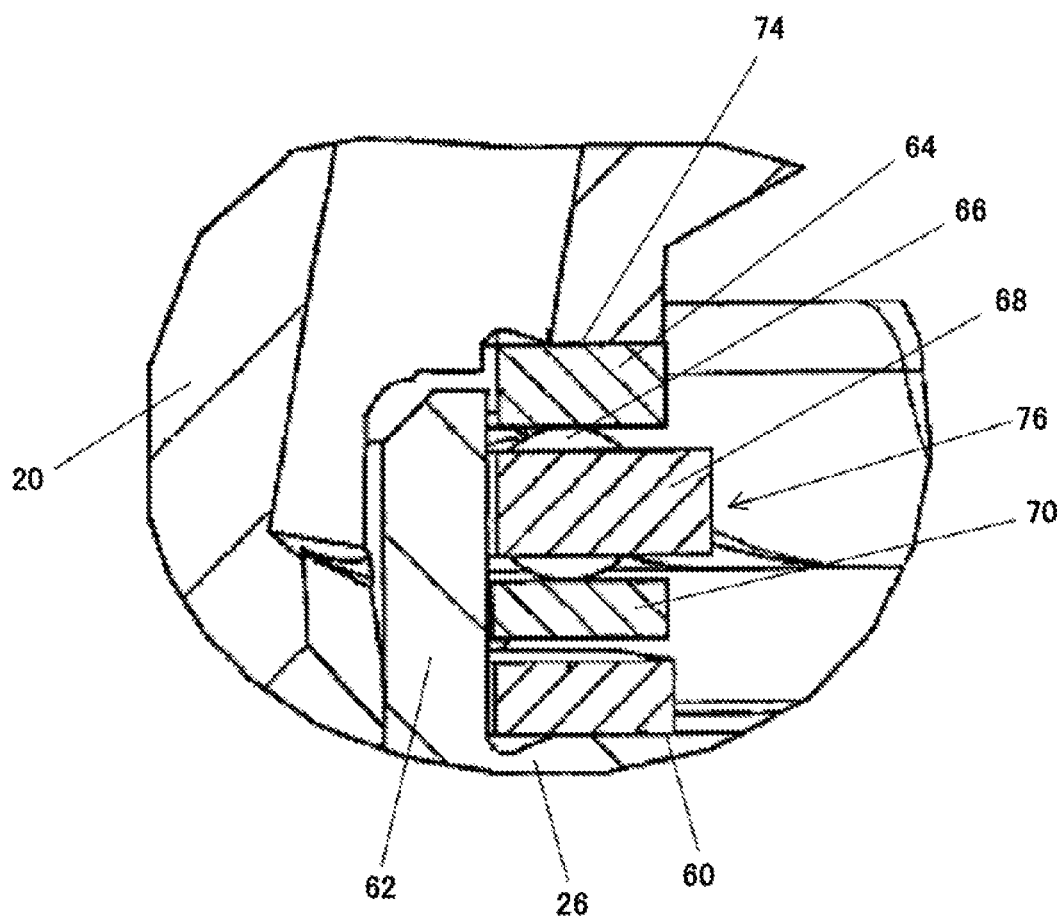
FIG. 30 is a view showing a portion of a conventional bearing device.

FIG. 28 is a view schematically showing a refrigeration unit according to Embodiment 8. FIG. 29 is a cross-sectional view taken along J-J of FIG. 28.

Referring to FIGS. 28 and 29, a refrigeration unit 200 according to Embodiment 8 includes the sealed compressor 100 according to Embodiment 1 and a casing 211. The casing 211 includes an inner casing 211A manufactured by vacuum-molding using a resin such as ABS resin, an outer casing 211B made of metal such as a pre-coat steel plate, and a foamed heat insulating material 211C such as hard urethane foam filled into a space formed between the inner casing 211A and the outer casing 211B.

An interior space of the casing 211 is partitioned into a plurality of storage rooms defined by separating walls 212 to 214. Specifically, a refrigerating room 219 is provided at an upper portion of the casing 211, and a storage room (not shown) and an ice making room 220 are arranged side by side under the refrigerating room 219. A freezing room 221 is provided under the storage room and the ice making room 220. A vegetable room 222 is provided under the freezing room 221.

The casing 211 is open at its front surface and is provided with doors. The refrigerating room 219 is provided with a rotatable door 215. The ice making room 220, the freezing room 221, and the vegetable room 222 are provided with drawing doors 216 to 218 having rails and the like, respectively.

The casing 211 has a recessed portion on a back portion thereof, which defines a mechanical room 240. The components constituting a refrigeration cycle, such as the sealed compressor 100, a drier (not shown) for removing a moisture, and a condenser 231, are accommodated into the mechanical room 240. Although in Embodiment 8, the mechanical room 240 is provided at the upper portion of the casing 211, it may be provided at a center portion or a lower portion of the casing 211.

The refrigeration cycle includes the sealed compressor 100, the discharge pipe 108, the condenser 231, a capillary 232, a cooler (evaporator) 228 and a suction pipe 107. Specifically, the sealed compressor 100 and the condenser 231 are coupled together by means of the discharge pipe 108, while the condenser 231 and the cooler 228 are coupled together by means of the capillary 232. The cooler 228 and the sealed compressor 100 are coupled together by means of the suction pipe 107.

The capillary 232 and the discharge pipe 108 extend vertically, and become sinuous horizontally in their intermediate portions. The capillary 232 and the discharge pipe 108 are arranged such that larger portions of pipes of the capillary 232 and of the discharge pipe 108 are in contact with each other, to enable exchange heat between them.

In the case of a refrigeration cycle using a three-way valve or a switch valve in the casing 211, these mechanical members are arranged inside the mechanical room 240, in some cases. Although in Embodiment 8, a pressure-reducing device comprises the capillary 232, for example, an electronic expansion valve capable of freely controlling a flow rate of a refrigerant, which is actuated by a pulse motor may be used as the pressure-reducing device.

The casing 211 is provided with the cooling room 226 at a back side of the center portion thereof. The cooling room 226 is defined by the separating wall 225 connecting the separating wall 212 and the separating wall 214 together. The cooler (evaporator) 228 is provided in the cooling room 226. A cooling fan 277 is positioned above the cooler 228 to blow cool air generated in the cooler 228 to the refrigerating room 219 or the like via a cool air passage 224, or the like. The cool air passage 224 is formed by a space defined by the separating wall 223 extending vertically on the separating wall 212 and the back surface of the casing 211.

[Operation of Refrigeration Unit]

Next, an operation of the refrigeration unit 200 according to Embodiment 8 will be described with reference to FIGS. 28 and 29.

In the refrigeration unit 200 according to Embodiment 8, the sealed compressor 100 is activated in response to a signal issued from a controller (not shown) depending on a set internal temperature, and a cooling operation is performed. Specifically, according to the operation of the sealed compressor 100, discharged refrigerant which is in a high-temperature and high-pressure state is supplied to the condenser 231 through the discharge pipe 108. A portion of the refrigerant is condensed and liquefied in the condenser 231, and is supplied to refrigerant pipes (not shown) attached to the side surface, the back surface, and the like of the casing 211. While flowing through the refrigerant pipes, the refrigerant is condensed and liquefied while suppressing generation of liquid droplets adhered to the casing 211 and is supplied to the capillary 232.

While flowing through the capillary 232, the refrigerant exchanges heat with the suction pipe 107 (including refrigerant flowing through the suction pipe 107), and its pressure is reduced. Then, the refrigerant which is in a low-temperature and low-pressure state is supplied to the cooler 228.

In the cooler 228, the refrigerant exchanges heat with the air present in the cooling room 226 and thereby is vaporized. Thereby, the air in the vicinity of the cooler 228 is cooled, and the cooled air is caused to flow through the cool air passage 224 by the cooling fan 227, and is supplied to the refrigerating room 219, etc. While flowing through the cool air passage 224, the cool air is divided to flow into the refrigerating room 219, the storage room (not shown), the ice making room 220, the freezing room 221 and the vegetable room 222, and cools them to attain their desired zones.

The cooled refrigerant is supplied to the sealed compressor 100 through the suction pipe 107, is compressed by the compressor 100 and is discharged to the discharge pipe 108. Thus, the refrigerant is circulated repetitively.

The refrigeration unit 200 according to Embodiment 8 configured as described above includes the sealed compressor 100 according to Embodiment 1, and therefore can achieve advantages achieved by the sealed compressor 100 according to Embodiment 1.

Hereinafter, the advantages realized when the sealed compressor 100 is actuated by the inverter unit will be described.

For example, when a utility power supply frequency is 50 HZ in the case where the sealed compressor 100 is actuated at a rated rotational speed by the inverter unit, the compressor 100 is actuated at 50 revolutions per second. In a case where the sealed compressor 100 can be actuated at the inverter unit at any one of plural rotational speeds, it can be actuated in any one of predetermined rotational speeds in a wide range, which are, for example, 20 revolutions, 35 revolutions, 40 revolutions, 50 revolutions, 60 revolutions, 75 revolutions, and 80 revolutions.

In the case where the sealed compressor 100 is actuated by the inverter unit at a rotational speed higher than the rated rotational speed, a centrifugal force applied to the shaft 110 increases, and thereby the shaft 110 tends to be displaced radially. However, in the present invention, the displacement of the upper race 135 with respect to the shaft 110 is limited, which makes it possible to suppress a deviation between the center of rotation of the main shaft section 111 of the shaft 110 and the center of the raceway groove 137 of the upper race 135, and hence the center of the pitch of the balls 134. As a result, the smooth rotation of the balls 134 can be maintained, generation of a noise can be suppressed, and a higher efficiency of the sealed compressor 100 can be achieved.

By comparison, during a low-speed operation of the sealed compressor 100, the compressor 100 vibrates greatly due to resonance, etc., so that the shaft 110 is more likely to be displaced radially. However, in the present invention, since the displacement of the upper race 135 with respect to the shaft 110 is limited, it becomes possible to suppress a deviation between the center of rotation of the main shaft section 111 of the shaft 110 and the center of the raceway groove 137 of the upper race 135, and hence the center of the pitch of the balls 134. As a result, the smooth rotation of the balls 134 can be maintained, generation of a noise can be suppressed, and a higher efficiency of the sealed compressor 100 can be achieved.

When the compressor 100 is actuated by the inverter unit at a frequency which is equal to or less than a utility power frequency, i.e., at a low speed, a sliding loss between the upper race 135 and the flange surface 145 will increase, and this sliding loss with respect to a total loss will increase. However, since the compressor 100 includes the limiting means (first limiting means) which suppresses the vertical displacement of the upper race 135 with respect to the flange surface 145 of the shaft 110 in the present invention, it is possible to suppress the upper race 135 from sliding on the flange surface 145 of the shaft 110, thereby allowing the upper race 135 and the shaft 110 to rotate together. In this way, during the low-speed operation, the efficiency of the sealed compressor 100 can be further enhanced.

Although in Embodiment 8, the refrigeration unit 200 according to Embodiment 8 includes the sealed compressor 100 according to Embodiment 1, it may include any one of the sealed compressors 100 according to Embodiment 2 to Embodiment 7 (and Modified examples).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

INDUSTRIAL APPLICABILITY

The sealed compressor and the refrigeration device comprising the sealed compressor of the present invention enables balls of a thrust ball bearing to maintain smooth rotation, and can achieve a higher efficiency of the sealed compressor.

REFERENCE SIGNS LIST 20 crankshaft
26 radial bearing hub 60 upper annular surface
62 upper annular extending section
64 upper annular race
66 ball
68 circular cage
70 lower annular race
74 flange
76 axial roller bearing
100 sealed compressor
101 sealed container
102 lubricating oil
103 stator
104 rotor
105 electric component
106 compression component
107 suction pipe
108 discharge pipe
110 shaft
111 main shaft section
112 eccentric shaft section
113 connecting section
114 cylinder block
115 guide section
116 compression chamber
117 cylinder
118 recess
120 main bearing unit
126 piston
128 connecting member
130 thrust surface
132 thrust ball bearing
133 cage
134 ball
135 upper race
136 lower race
137 raceway groove
138 raceway grove
139 cage pockets
140 electromagnetic steel plate
141 stack
142 first member
143 second member
144 bearing extending section
145 flange surface
146 gap
147 flange surface
150 spring
160 terminal
161 lead wire
170 upper end
180 fourth engagement section
182 third engagement section
190 convex section
191 adjustment member
200 refrigeration unit
201 inverter unit
202 utility power supply
203 electric wire
211 casing
211A inner casing
211B outer casing
211C foamed heat insulating material
212 separating wall
213 separating wall
214 separating wall
215 door
216 door
217 door
218 door
219 refrigerating room
220 ice making room
221 freezing room
222 vegetable room
223 separating wall
224 cool air passage
225 separating wall
226 cooling room
227 cooling fan
228 cooler (evaporator)
231 condenser
232 capillary
240 mechanical room
338 wave washer
415 adjustment member (elastic member)
515 first engagement section
525 second engagement section

The invention claimed is:

1. A sealed compressor comprising:
an electric component including a stator and a rotor;
a compression component actuated by the electric component; and
a sealed container which accommodates the electric component and the compression component and stores lubricating oil therein,
wherein the compression component includes
a shaft including a main shaft section to which the rotor is fastened and an eccentric shaft section,
a cylinder block having a compression chamber,
a piston reciprocatable inside the compression chamber,
a connecting member for coupling the piston to the eccentric shaft section,
a main bearing unit mounted to the cylinder block and supporting the main shaft section such that the main shaft section is rotatable, and
a thrust ball bearing mounted to a thrust surface of the main bearing unit,
wherein the thrust ball bearing includes
a plurality of balls held in a cage,
an upper race having main surfaces one of which is in contact with upper portions of the balls, and
a lower race having main surfaces one of which is in contact with lower portions of the balls,
wherein the main shaft section is inserted in an inner periphery of the upper race, an upper main surface of the upper race is in contact with a flange surface, and a lower main surface of the upper race is above an upper end of a bearing extending section,
wherein the bearing extending section is inserted in an inner periphery of the lower race and an inner periphery of the cage,
wherein a first clearance is formed between an outer peripheral surface of the main shaft section and an inner peripheral surface of the upper race, the first clearance being a distance separating the outer peripheral surface of the main shaft section and the inner peripheral surface of the upper race in a radial direction before operation of the compressor,
wherein a second clearance is formed between an outer peripheral surface of the bearing extending section and an inner peripheral surface of the cage, the second clearance being a distance separating the outer peripheral surface of the bearing extending section and the inner peripheral surface of the cage in the radial direction before operation of the compressor, wherein a third clearance is formed between the outer peripheral surface of the bearing extending section and an inner peripheral surface of the lower race, the third clearance being a distance separating the outer peripheral surface of the bearing extending section and the inner peripheral surface of the lower race in the radial direction before operation of the compressor, wherein raceway grooves formed by annular grooves are provided on the lower main surface of the upper race and the upper main surface of the lower race, respectively, the lower main surface of the upper race and the upper main surface of the lower race facing each other, wherein the balls are placed on the raceway groove of the upper race and the raceway groove of the lower race, wherein the first clearance is smaller than the second clearance and the third clearance, wherein the second clearance is greater than the third clearance, and wherein the first clearance, the second clearance, and the third clearance are arranged at an inner periphery of the thrust ball bearing.

2. The sealed compressor according to claim 1, wherein a clearance formed between the outer peripheral surface of the main shaft section and the inner peripheral surface of the cage is greater than the first clearance and a clearance formed between the outer peripheral surface of the main shaft section and the inner peripheral surface of the lower race.

3. The sealed compressor according to claim 1, further comprising:
an inverter unit;
wherein the sealed compressor is actuated by the inverter unit at any one of two or more rotational speeds including a rotational speed driving frequency higher than a power supply frequency.

4. A refrigeration unit comprising:
the sealed compressor according to claim 1.

5. The sealed compressor according to claim 1, wherein the upper race is disposed to have a gap between the lower main surface of the upper race and the upper end of the bearing extending section.

6. The sealed compressor according to claim 1, wherein the upper race has an outer diameter greater than an outer diameter of the flange surface, and an inner diameter dimension smaller than an outer diameter of the bearing extending section.

7. The sealed compressor according to claim 1, wherein a radial displacement of the upper race with respect to the shaft is limited.

8. The sealed compressor according to claim 7, further comprising a fastening means which inhibits a radial displacement of the upper race with respect to the main shaft section.

9. The sealed compressor according to claim 8, wherein the fastening means comprises an adjustment member disposed between the outer peripheral surface of the main shaft section and the inner peripheral surface of the upper race.

10. The sealed compressor according to claim 8, wherein the fastening means comprises fitting between the inner peripheral surface of the upper race and the outer peripheral surface of the main shaft section.

11. The sealed compressor according to claim 7, further comprising an engagement means for engaging the main shaft section and the upper race with each other.

12. The sealed compressor according to claim 11, wherein the engagement means includes:
a third engagement section having a recess shape on the outer peripheral surface of the main shaft section and a fourth engagement section having a convex shape on the inner peripheral surface of the upper race,
or a third engagement section having a convex shape on the outer peripheral surface of the main shaft section and a fourth engagement section having a recess shape on the inner peripheral surface of the upper race;
the third engagement section and the fourth engagement section are similar to each other;
and the main shaft section and the upper race are disposed such that the third engagement section and the fourth engagement section are engageable with each other.

13. The sealed compressor according to claim 11, wherein the compression component is positioned above the electric component;
the shaft has a connecting section for connecting the main shaft section to the eccentric shaft section,
the connecting section is provided with a flange surface contacting the other main surface of the upper race; and
the engagement means includes a first engagement section formed on the flange surface and a second engagement section formed on the other main surface of the upper race to be engageable with the first engagement section.

14. The sealed compressor according to claim 11, wherein the compression component is positioned below the electric component;
wherein the rotor is provided on a lower surface thereof with a flange surface contacting the other main surface of the upper race; and
wherein the engagement means includes a first engagement section formed on the flange surface and a second engagement section formed on the other main surface of the upper race to be engageable with the first engagement section.

15. The sealed compressor according to claim 1, wherein a vertical displacement of the upper race with respect to the shaft is limited.

16. The sealed compressor according to claim 15, further comprising a pressing section which presses an upper portion of the thrust ball bearing from above.

17. The sealed compressor according to claim 16, wherein the pressing section comprises a pressing member disposed between the other main surface of the upper race and the flange surface.

18. The sealed compressor according to claim 17, wherein the pressing member has a stiffness lower than a stiffness of the upper race.

19. The sealed compressor according to claim 17, wherein the pressing member has a height smaller than a height of the upper race.

20. The sealed compressor according to claim 16, wherein the compression component is provided with a flange surface which faces the upper race; and
the pressing section comprises an annular convex section provided on the flange surface.

21. The sealed compressor according to claim 20, wherein the convex section has a shape in which a length between the outer diameter and the inner diameter is equal to or greater than $1/8$ of the diameter of the balls.

22. The sealed compressor according to claim 20, wherein the convex section has a shape in which its inner diameter is greater than a length derived by subtracting a diameter of the balls from a pitch diameter of the balls, and its outer diameter is equal to or greater than the pitch diameter of the balls.

23. The sealed compressor according to claim 20, wherein the convex section is configured such that a track of an intermediate point between the outer diameter and the inner diameter is located outward relative to a pitch of the balls.

24. The sealed compressor according to claim 20, wherein the convex section has a tip end formed by a flat surface perpendicular to a center axis of the main shaft section.

* * * * *